US 10,959,227 B2

(12) United States Patent
Zhang et al.

(10) Patent No.: US 10,959,227 B2
(45) Date of Patent: *Mar. 23, 2021

(54) COMMUNICATION RESOURCE ALLOCATION SYSTEMS AND METHODS

(71) Applicant: APPLE INC., Cupertino, CA (US)

(72) Inventors: Hang Zhang, Nepean (CA); Mo-Han Fong, L'Orignal (CA); Peiying Zhu, Kanata (CA); Wen Tong, Ottawa (CA); Jianglei Ma, Kanata (CA)

(73) Assignee: Apple Inc., Cupertino, CA (US)

(*) Notice: Subject to any disclaimer, the term of this patent is extended or adjusted under 35 U.S.C. 154(b) by 276 days.

This patent is subject to a terminal disclaimer.

(21) Appl. No.: 15/823,120

(22) Filed: Nov. 27, 2017

(65) Prior Publication Data

US 2018/0092098 A1    Mar. 29, 2018

Related U.S. Application Data

(63) Continuation of application No. 15/075,474, filed on Mar. 21, 2016, now Pat. No. 9,832,775, which is a
(Continued)

(51) Int. Cl.
*H04W 72/04* (2009.01)
*H04L 5/00* (2006.01)
(Continued)

(52) U.S. Cl.
CPC ....... *H04W 72/0453* (2013.01); *H04L 5/0058* (2013.01); *H04L 5/0091* (2013.01);
(Continued)

(58) Field of Classification Search
CPC .............................................. H04W 72/0453
See application file for complete search history.

(56) References Cited

U.S. PATENT DOCUMENTS 6,473,467 B1    10/2002  Wallace et al.
6,747,959 B1     6/2004  Ho
(Continued)

FOREIGN PATENT DOCUMENTS

CN    1331528       1/2002
CN    1399417 A     2/2003
(Continued)

OTHER PUBLICATIONS

Gore D A et al: "Selecting an optimal set of transmit antennas for a low rank matrix channel", Acoustics, Speech, and Signal Processing, 2000. ICASSP '00. Proceedings. 2000 IEEE International Conference on Jun. 5-9, 2000, Piscataway, NJ, USA,IEEE, vol. 5, Jun. 5, 2000 (Jun. 5, 2000), pp. 2785-2788, XP010506585, DOI: 10.1109/ICASSP.2000.861082 ISBN: 978-0-7803-6293-2.
(Continued)

*Primary Examiner* — Samina F Choudhry
(74) *Attorney, Agent, or Firm* — Fay Kaplun & Marcin, LLP

(57) ABSTRACT

A channel descriptor management message is transmitted on a broadcast connection to a mobile terminal. The channel descriptor management message provides a format for a frame. The frame includes a resource space. The channel descriptor management message defines a plurality of channels within the resource space and allocates at least one of the channels to a plurality of users. Subsequent resource allocation messages may refer to a location within a channel rather than a location within the entire resource space.

18 Claims, 19 Drawing Sheets

Related U.S. Application Data continuation of application No. 14/450,987, filed on Aug. 4, 2014, now Pat. No. 9,294,252, which is a continuation of application No. 11/665,310, filed as application No. PCT/CA2005/001588 on Oct. 17, 2005, now Pat. No. 8,797,836.

(60) Provisional application No. 60/693,328, filed on Jun. 23, 2005, provisional application No. 60/658,696, filed on Mar. 4, 2005, provisional application No. 60/619,461, filed on Oct. 15, 2004.

(51) Int. Cl.
  *H04W 28/06* (2009.01)
  *H04L 27/26* (2006.01)

(52) U.S. Cl.
  CPC ......... *H04L 5/0092* (2013.01); *H04W 72/042* (2013.01); *H04L 27/2601* (2013.01); *H04W 28/06* (2013.01)

(56) References Cited

U.S. PATENT DOCUMENTS

| | | | |
|---|---|---|---|
| 2002/0118666 A1* | 8/2002 | Stanwood | H04B 7/2615 370/345 |
| 2002/0122381 A1 | 9/2002 | Wu et al. | |
| 2003/0072254 A1 | 4/2003 | Ma et al. | |
| 2003/0072255 A1 | 4/2003 | Ma et al. | |
| 2003/0093546 A1* | 5/2003 | Roy | H04L 12/1881 709/231 |
| 2003/0161282 A1 | 8/2003 | Medvedev et al. | |
| 2003/0235147 A1 | 12/2003 | Walton et al. | |
| 2005/0259629 A1* | 11/2005 | Oliver | H04B 7/2659 370/345 |

FOREIGN PATENT DOCUMENTS

| | | |
|---|---|---|
| CN | 1414803 | 4/2003 |
| CN | 1567764 A | 1/2005 |
| EP | 1185048 | 3/2002 |
| EP | 359683 A1 | 11/2003 |
| GB | 2386519 B | 5/2004 |
| WO | 0072464 | 11/2000 |
| WO | 02/096011 | 11/2002 |
| WO | 2003-034642 | 4/2003 |
| WO | 2003-034644 | 4/2003 |
| WO | 2004-077730 | 9/2004 |

OTHER PUBLICATIONS

Sandhu S et al: "Near-optimal selection of transmit antennas for a MIMO channel based on shannon capacity", Signals, Systems and Computers, 2000. Conference Record of the Thirty-Fourth Asilomar Conference on Oct. 29-Nov. 1, 2000, Piscataway, NJ, USA,IEEE, vol. 1, Oct. 29, 2000 (Oct. 29, 2000), pp. 567-571, XP010535430, ISBN: 978-0-7803-6514-8.

Kwang et al., "A preamble-based cell searching technique for OFDM cellular systems", Vehicular Technology Conference, 2003. VTC 2003—Fall. 2003 IEE 58$^{th}$ Orlando, FL, USA Oct. 6-9, 2003; [IEEE Vehicular Technology Conference], Piscataway, NJ, US, IEEE, US, vol. 4, Oct. 6, 2003 (Oct. 6, 2003), pp. 2471-2475, XP010702613, ISBN: 978-0-7803-7954-1.

Tong et al., "Enhancement of fast cell search and reduced complexity for cell search", IEEE C802.16E-04/115, May 17, 2004 (May 17, 2004), XP008116232.

Babak Hassibi et al: "High-Rate Codes That Are Linear in Space and Time", IEEE Transactions on Information Theory, IEEE Press, USA, vol. 48, No. 7, Jul. 1, 2002 (Jul. 1, 2002), XP011074516, ISSN: 0018-9448.

Liu K J R et al: "Obtaining full-diversity space-frequency codes from space-time codes via mapping", IEEE Transactions on Signal Processing, IEEE Service Center, New York, NY, US, vol. 51, No. 11, Nov. 1, 2003 (Nov. 1, 2003), pp. 2905-2916, XP011102805, ISSN: 1053-587X, DOI: 10.1109/TSP.2003.818200.

Girish Ganesan et al: "Space-Time Block Codes: A Maximum SNR Approach" IEEE Transactions on Information Theory, IEEE Press, USA, vol. 47, No. 4, May 1, 2001 (May 1, 2001 ), XP011027942, ISSN: 0018-9448.

Su W et al: "On Space-Time Block Codes From Complex Orthogonal Designs", Wireless Personal Communications, Springer, Dordrecht, NL, vol. 25, No. 1, Apr. 1, 2003 (Apr. 1, 2003), pp. 1-26, XP001161537, ISSN: 0929-6212, DOI: 10.1023/A:1023688509457.

Ouachani I et al: "Trading rate versus diversity in space—time-frequency block coding schemes", Control, Communications and Signal Processing, 2004. First International Symposium on Hammamet, Tunisia Mar. 21-24, 2004, Piscataway, NJ, USA,IEEE, Mar. 21, 2004 (Mar. 21, 2004 ), pp. 171-174, XP010705669, DOI: 10.1109/ISCCSP.2004.1296245 ISBN: 978-0-7803-8379-1.

Triolo A A et al: "OFDM space-time trellis coded MIMO systems with experimental results", Military Communications Conference. MILCOM 2002. Proceedings.Anaheim, CA, Oct. 7-10, 2002; [IEEE Military Communications Conference], New York, NY: IEEE.; US, vol. 1, Oct. 7, 2002 (Oct. 7, 2002), pp. 577-581, XP010632167, DOI: 10.1109/MILCOM.2002.1180507 ISBN: 978-0-7803-7625-0.

Sang Hyo Kim et al: "A frame synchronization scheme for uplink MC-CDMA", Vehicular Technology Conference, 1999. VTC 1999—Fall. IEEE VTS 50th Amsterdam, Netherlands Sep. 19-22, 1999, Piscataway, NJ, USA, IEEE, US, vol. 4, Sep. 19, 1999 (Sep. 19, 1999), pp. 2188-2192,XP010352999, ISBN: 978-0-7803-5435-7.

Roh et al., "Enhanced Mac Support for MIMO OFDMA, C80216e-04_19", IEEE Draft: C80216E-044_99, IEEE-SA, Piscataway, NJ USA, vol. 802.16e Jun. 14, 2004 (Jun. 4, 2004), pp. 1-9, XP017623816.

"Extension of Collaborative Spatial Multiplexing in OFDMA, C80216e-04_286r2", IEEE Draft: C80216E-04_286R2, IEEE-SA, Piscataway, NJ USA, vol. 802.16e Aug. 29, 2004 (Aug. 29, 2004), pp. 1-6, XP017624418.

\* cited by examiner

| 1000 | DEPTH = 1 |

| 1001 |
| 1002 |
DEPTH = 2

| 1003 | 1004 |
| 1005 | 1006 |
DEPTH = 4

| 1007 | 1008 |
| 1009 | 1010 |
| 1011 | 1012 |
| 1013 | 1014 |
DEPTH = 8

| 1015 | 1016 | 1017 | 1018 |
| 1019 | 1020 | 1021 | 1022 |
| 1023 | 1024 | 1025 | 1026 |
| 1027 | 1028 | 1029 | 1030 |
DEPTH = 16

| CHANNEL ID = 00011 <br> 1103 | CHANNEL ID = 00100 <br> 1104 | |
|---|---|---|
| CHANNEL ID = 00101 <br> 1105 | CHANNEL ID = 11001 <br> 1125 | CHANNEL ID = 11010 <br> 1126 |
| | CHANNEL ID = 11101 <br> 1129 | CHANNEL ID = 11110 <br> 1130 |

CHANNEL ID = 00011
1203

CHANNEL ID = 10100
1220

CHANNEL ID = 00100
1204

CHANNEL ID = 00101
1205

CHANNEL ID = 00110
1206

| 1401 | 1402 | 1403 | 1404 | | | |
|------|------|------|------|------|------|------|
| 1405 | 1406 | 1407 | 1408 | 1409 | 1410 | |
| 1411 | 1412 | 1413 | 1414 | 1415 | 1416 | 1417 | 1418 |
| 1419 | 1420 | 1421 | 1422 | 1423 | 1424 | 1425 | 1426 |

| 1501 || 1502 ||
|---|---|---|---|
| 1503 | 1504 | 1505 | 1506 |
| 1507 | 1508 | 1509 | 1510 |

FIG. 15

COMMUNICATION RESOURCE ALLOCATION SYSTEMS AND METHODS

FIELD OF THE INVENTION

The present invention relates to wireless communication and, in particular, to methods of allocating a communication resource among multiple users.

BACKGROUND

In communication transmission interfaces using dynamic resource sharing, it is common for a resource management entity to schedule resource usage among one or more end-users at each of a sequence of scheduling intervals. The resource being shared may be, for example, time, codes, frequency, antennae to name a few, or combinations thereof (multiple dimensional resource). To allocate a multiple dimensional resource, the allocation of resources for each dimension is indicated.

In situations where the resource space is large, for example, broadband systems including multiple antennas wherein a relatively small resource granularity is to be accommodated, the assignment of resources is known to incur significant overhead. Exemplary such multiple-antenna systems are known as Multiple-Input Multiple-Output (MIMO) Orthogonal Frequency-Division Multiplexing (OFDM) systems.

In addition to dividing data to be transmitted among frequencies, data may also be divided in time in a scheme called Time Division Multiplexing. Organizing data in frequency and time can be facilitated through the definition of a transmission unit, i.e., a frame.

As will be apparent to one of ordinary skill in the art, wireless broadband access systems using OFDM may be used to enable high speed data services. In particular, Orthogonal Frequency-Division Multiple Access (OFDMA) based broadband access air interfaces are known to allocate a two-dimensional resource (subchannel and OFDM symbol) in each frame in order to optimize frequency-time domain diversity. In addition, a sufficiently small resource granularity for accommodating small amounts of traffic per frame is employed, to support voice over Internet Protocol (VoIP) data, for example. Unfortunately, such OFDMA-based systems are known to incur significant resource allocation signaling overhead. That is, often a significant amount of resource allocation signaling bits are required to indicate, to the receiver of a frame, the location in the frame at which data relevant to the receiver may be found.

A need exists, therefore, for an improved method for allocating communication resources.

SUMMARY

Since significant resources are required to indicate the location of relevant data in a vast resource space, the resource space may be logically divided into sub-resource spaces, or "channels". When allocating downlink or uplink resources to a terminal, a location for the resource may be identified first by the channel and then by a location within the channel, thereby saving allocation resources. A channel descriptor management message may be transmitted to define a plurality of channels within a given resource space. A subsequent resource allocation message may then allocate resources within at least one of the channels to a plurality of users.

In accordance with an aspect of the present invention there is provided a method of reducing resource allocation overhead. The method includes transmitting a channel descriptor management message on a broadcast connection to a mobile terminal, the channel descriptor management message providing a format for a transmission unit, the transmission unit including a resource space and the channel descriptor management message providing a definition for a plurality of sub-resource spaces within the resource space. In another aspect of the invention, a system is provided for carrying out the method.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 10 illustrates a frame of channels defined using a hierarchical channel definition scheme according to an embodiment of the present invention;

FIG. 11 illustrates allocation of resources to hierarchically defined channels according to an embodiment of the present invention;

FIG. 12 illustrates allocation of resources to hierarchically defined channels according to an embodiment of the present invention;

FIG. 14 illustrates a frame of channels defined using a first option of a hybrid hierarchical/non-hierarchically channel definition scheme according to an embodiment of the present invention;

FIG. 15 illustrates a frame of channels defined using a second option of a hybrid hierarchical/non-hierarchically channel definition scheme according to an embodiment of the present invention;

DETAILED DESCRIPTION

Figure 1:
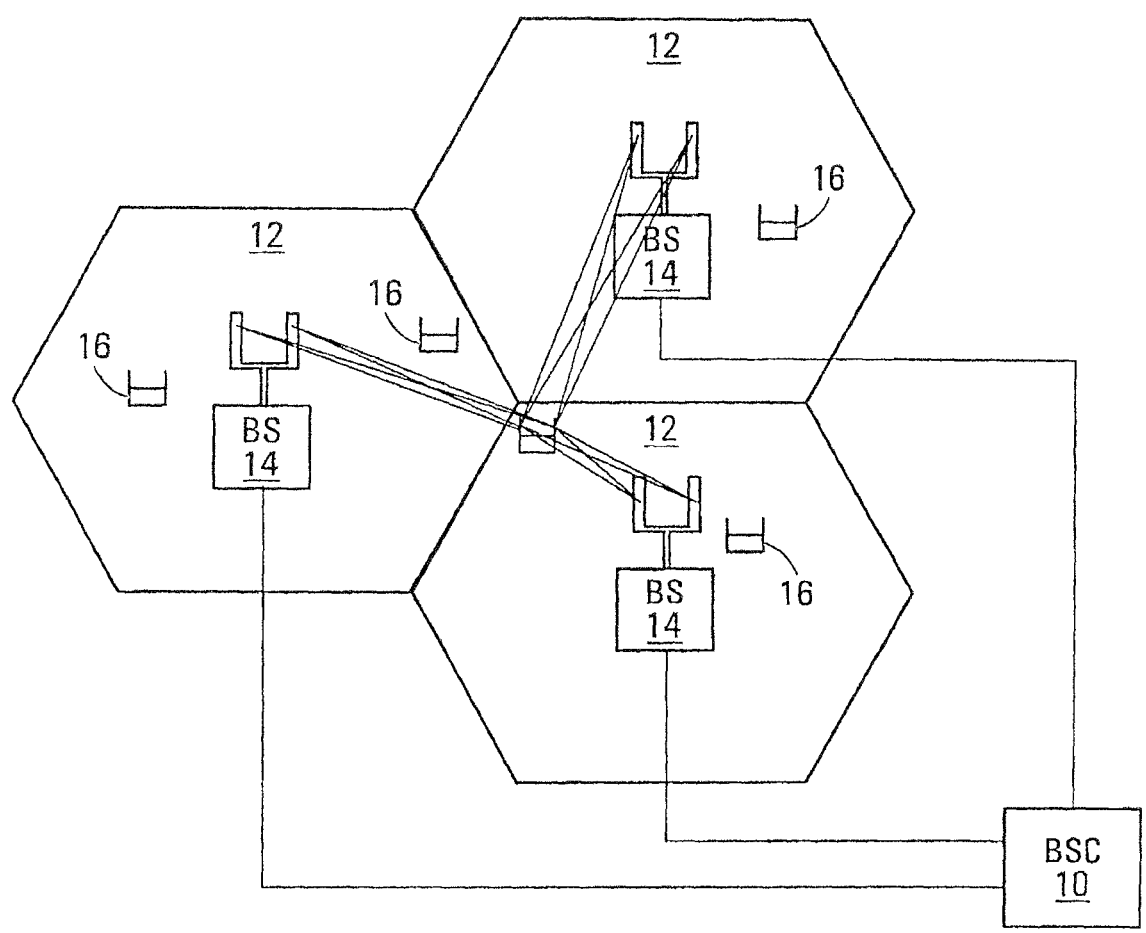
FIG. 1 is a block representation of a cellular communication system.

For the purposes of providing context for embodiments of the invention for use in a communication system, FIG. 1 shows a base station controller (BSC) 10 which controls wireless communications within multiple cells 12, which cells 12 are served by corresponding base stations (BS) 14. In general, each base station 14 facilitates communications using OFDM with Mobile Subscriber Stations (MSS), also called mobile and/or wireless terminals 16, which are within the cell 12 associated with the corresponding base station 14. The movement of the mobile terminals 16 in relation to the base stations 14 is known to result in significant fluctuation in channel conditions. As illustrated, the base stations 14 and mobile terminals 16 may include multiple antennas to provide spatial diversity for communications.

A high level overview of the mobile terminals 16 and base stations 14 upon which aspects of the present invention are implemented is provided prior to delving into the structural and functional details of the preferred embodiments.

Figure 2:
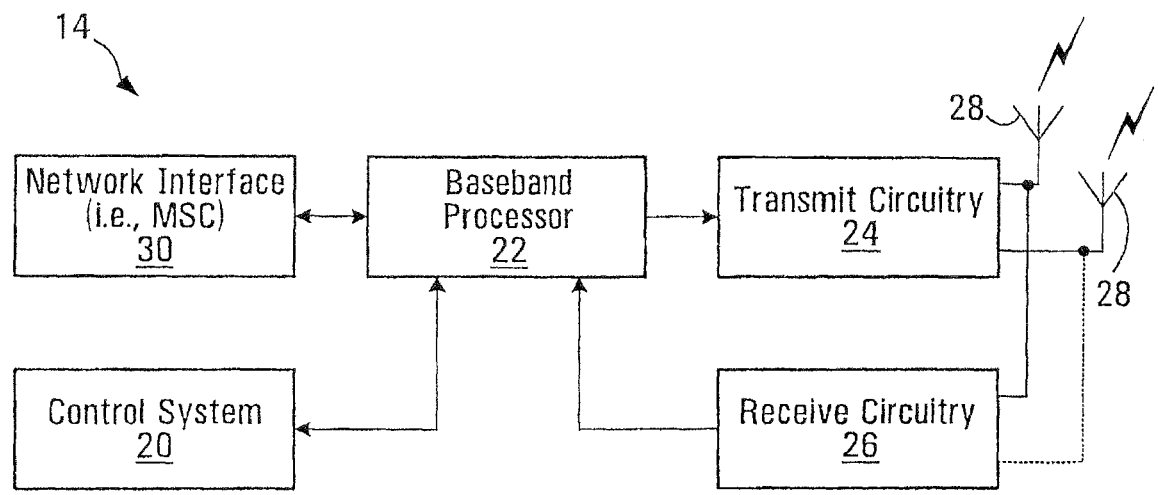
FIG. 2 is a block representation of a base station according to an embodiment of the present invention.

With reference to FIG. 2, a base station 14 is illustrated. The base station 14 generally includes a control system 20, a baseband processor 22, transmit circuitry 24, receive circuitry 26, multiple antennas 28 and a network interface 30. The receive circuitry 26 receives radio frequency signals bearing information from one or more remote transmitters provided by the mobile terminals 16 (illustrated in FIG. 1). Preferably, a low noise amplifier and a filter (not shown) cooperate to amplify and remove broadband interference from the signal for processing. Downconversion and digitization circuitry (not shown) then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data or control information, from the network interface 30 under the control of control system 20 and encodes the data for transmission. The encoded data is output to the transmit circuitry 24, where the encoded data is modulated by a carrier signal having a desired transmit frequency or frequencies. A power amplifier (not shown) amplifies the modulated carrier signal to a level appropriate for transmission and delivers the modulated carrier signal to the antennas 28 through a matching network (not shown). Modulation and processing details are described in greater detail below.

Figure 3:
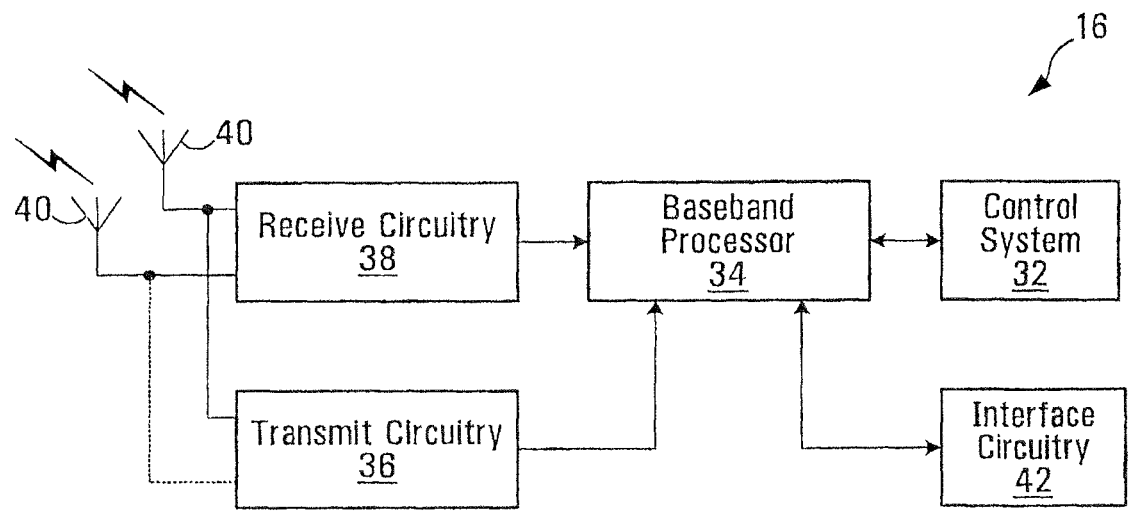
FIG. 3 is a block representation of a mobile terminal according to an embodiment of the present invention.

With reference to FIG. 3, a mobile terminal 16, configured according to one embodiment of the present invention, is illustrated. The mobile terminal 16 may be configured, in a manner similar to base station 14, to include a control system 32, a baseband processor 34, transmit circuitry 36, receive circuitry 38, multiple antennas 40 and user interface circuitry 42. The receive circuitry 38 receives radio frequency signals bearing information from one or more base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding and error correction operations. The baseband processor 34 is generally implemented in one or more DSPs and ASICs.

For transmission, the baseband processor 34 receives digitized data, which may represent voice, data or control information, from the control system 32. The baseband processor 34 may then encode the digitized data for transmission. The encoded data is output to the transmit circuitry 36, where the encoded data is used by a modulator to modulate a carrier signal that is at a desired transmit frequency or frequencies. A power amplifier (not shown) amplifies the modulated carrier signal to a level appropriate for transmission and delivers the modulated carrier signal to the antennas 40 through a matching network (not shown). Various modulation and processing techniques available to those skilled in the art are used for signal transmission between the mobile terminal 16 and the base station 14.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals that have a relatively low transmission rate and are capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28 and each mobile terminal 16 is equipped with "m" receive antennas 40. Notably, the respective antennas can be used for reception and transmission using appropriate duplexers or switches and are so labeled only for clarity.

Figure 4:
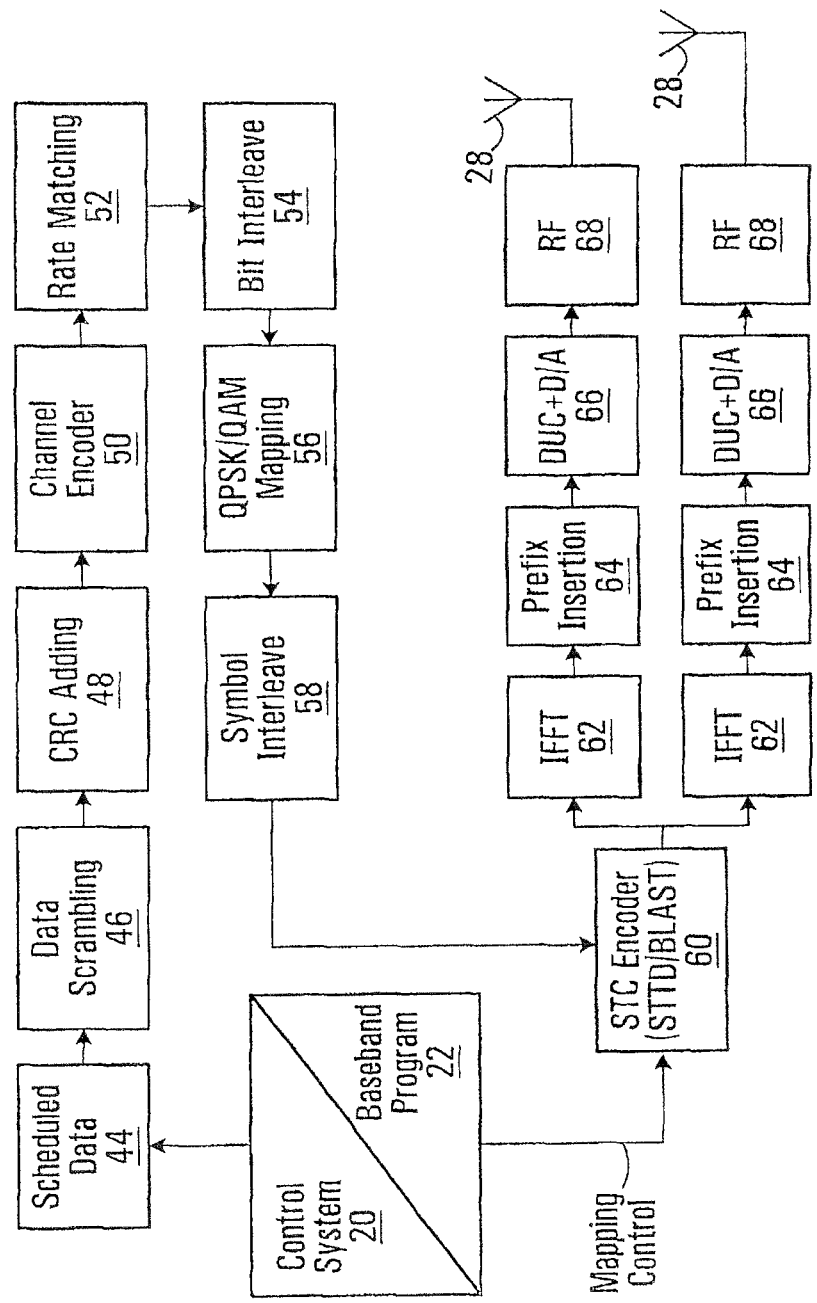
FIG. 4 is a logical breakdown of an OFDM transmitter architecture according to an embodiment of the present invention.

With reference to FIG. 4, a logical OFDM transmission architecture will be described. Initially, the base station controller 10 (see FIG. 1) will send data, which is to be transmitted to various mobile terminals 16, to the base station 14. The base station 14 may use channel quality indicators (CQIs) associated with the mobile terminals 16 to schedule the data for transmission as well as to select appropriate coding and modulation for transmitting the scheduled data. The CQIs may be received directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI associated with the particular mobile terminal 16. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal 16. The symbols may be systematically reordered, to further bolster the immunity of the transmitted signal to periodic data loss caused by frequency selective fading, using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22, as described above with respect to FIG. 2, will provide a mapping control signal to control STC encoding. At this point, it may be assumed that the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified and transmitted via the RF circuitry 68 and antennas 28. Notably, pilot signals known by the intended mobile terminal 16 to be scattered among a plurality of sub-carriers. The mobile terminal 16, whose operation is discussed in detail below, may measure the pilot signals for channel estimation.

Figure 5:
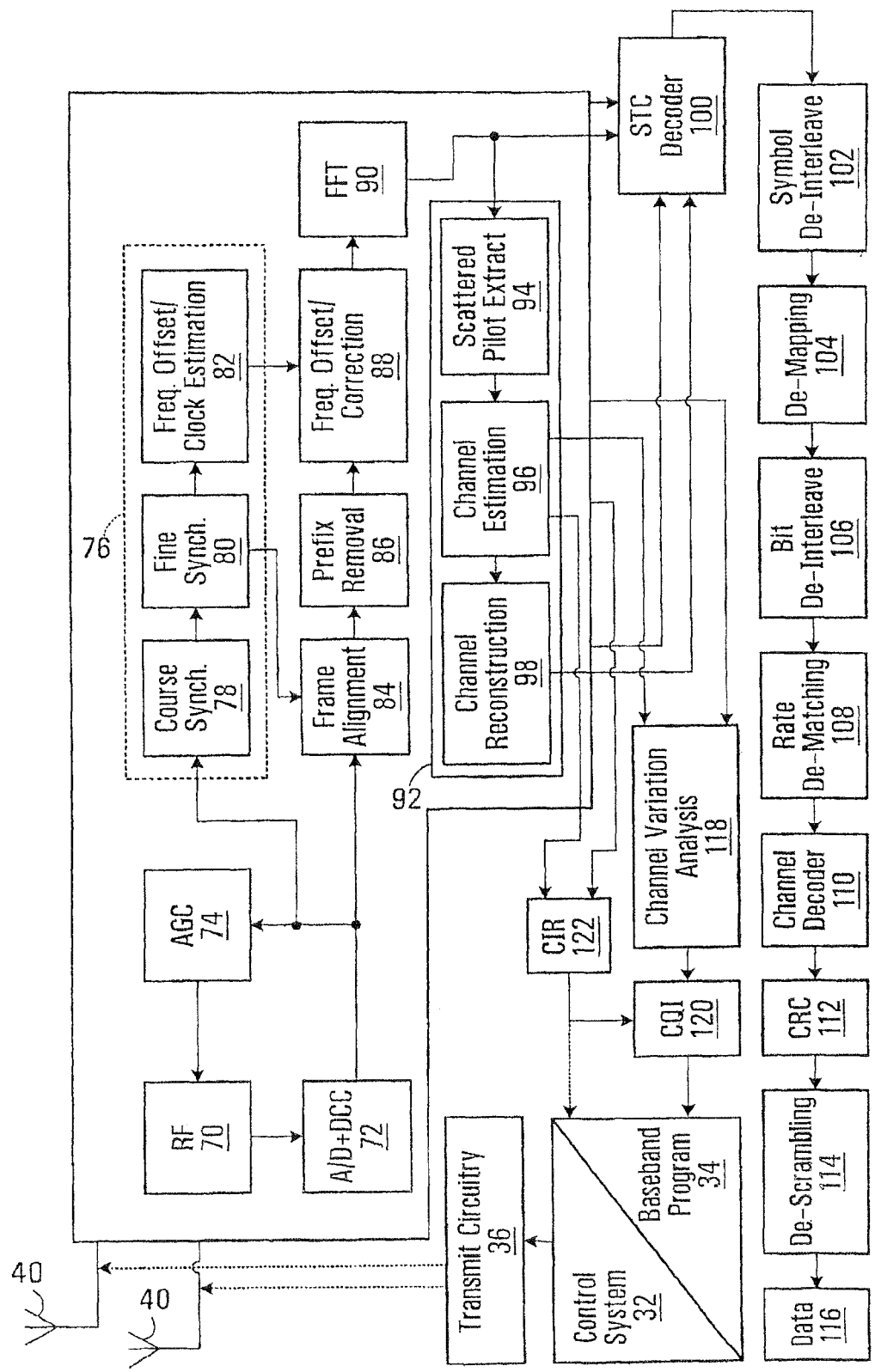
FIG. 5 is a logical breakdown of an OFDM receiver architecture according to an embodiment of the present invention.

Reference is now made to FIG. 5 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths are described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

Figure 6:
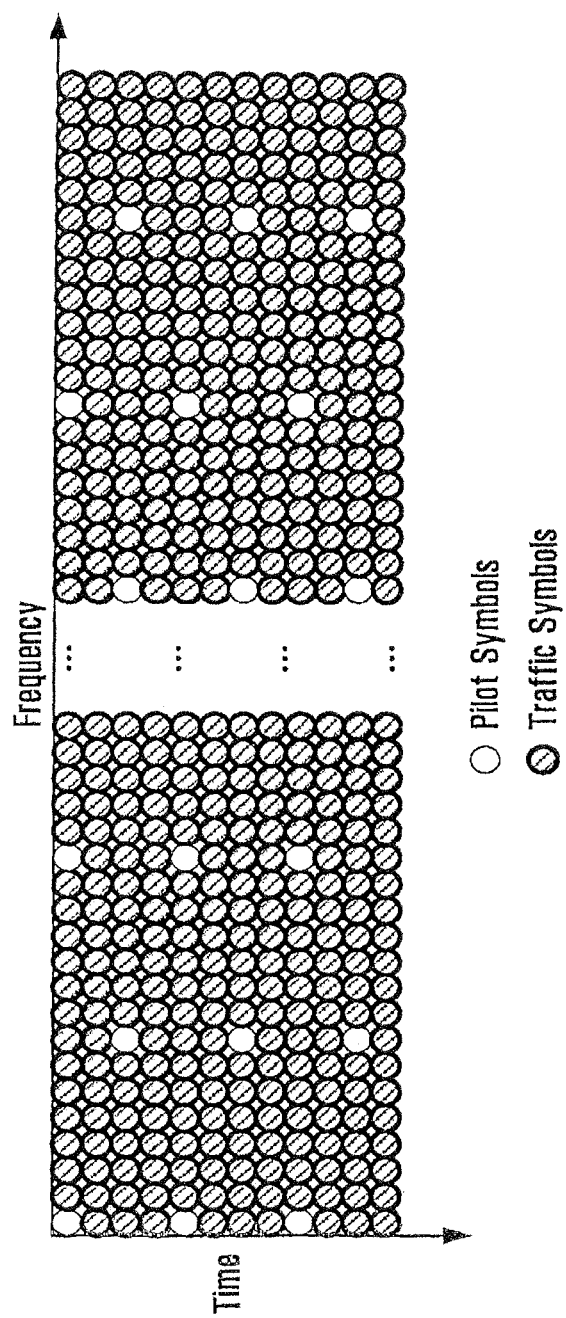
FIG. 6 illustrates a pattern of sub-carriers for carrying pilot symbols in a typical OFDM environment.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96 and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. FIG. 6 illustrates an exemplary scattering of pilot symbols among available sub-carriers over a given time and frequency plot in an OFDM environment.

Continuing with FIG. 5, the processing logic 92 compares the received pilot symbols with the pilot symbols that are expected in certain sub-carriers at certain times to determine a channel response for the sub-carriers in which the pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (C/I), as well as the degree to which the channel response varies across the various sub-carriers in the OFDM frequency band. The channel gain for each sub-carrier in the OFDM frequency band being used to transmit information may be compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

FIGS. 1 to 5 provide one specific example of a communication system that could be used to implement embodiments of the invention. It is to be understood that embodiments of the invention can be implemented with communications systems having architectures that are different than the specific example, but that operate in a manner consistent with the implementation of the embodiments as described herein.

The known Media Access Control (MAC) layer is used to enable features in the physical (PHY) layer in an OFDMA air interface framework. Frames are a format used to transmit "bursts" of data over the air interface between the base station 14 and the mobile terminal 16. The mobile terminal 16 is, for example, any known wireless device such as a cellular telephone, a computer with a wireless modem or a Personal Digital Assistant (PDA). Various types of information elements (IE) are included in the frame to provide a structure within the frame for defining where downlink information and uplink information are located within the frame. Each IE defines a rectangle in the (time, sub-channels) grid used to carry a specific sub-burst.

In overview, in accordance with embodiments of the invention, schemes for allocating resources in an OFDMA-based wireless network are provided, which OFDMA-based wireless network operates in accordance with the IEEE Broadband Metropolitan Area Networks Standard (IEEE P802.16e/D5a-2004). One of skill in the art will appreciate, however, that the broader embodiments of the invention are not limited in this regard but are equally applicable to other wireless technologies, including Multi-carrier CDMA (C-CDMA) and, even, to Wireline technology. It should further be appreciated that embodiments of the invention are as applicable to uplink communications as they are to downlink communications.

Figure 7:
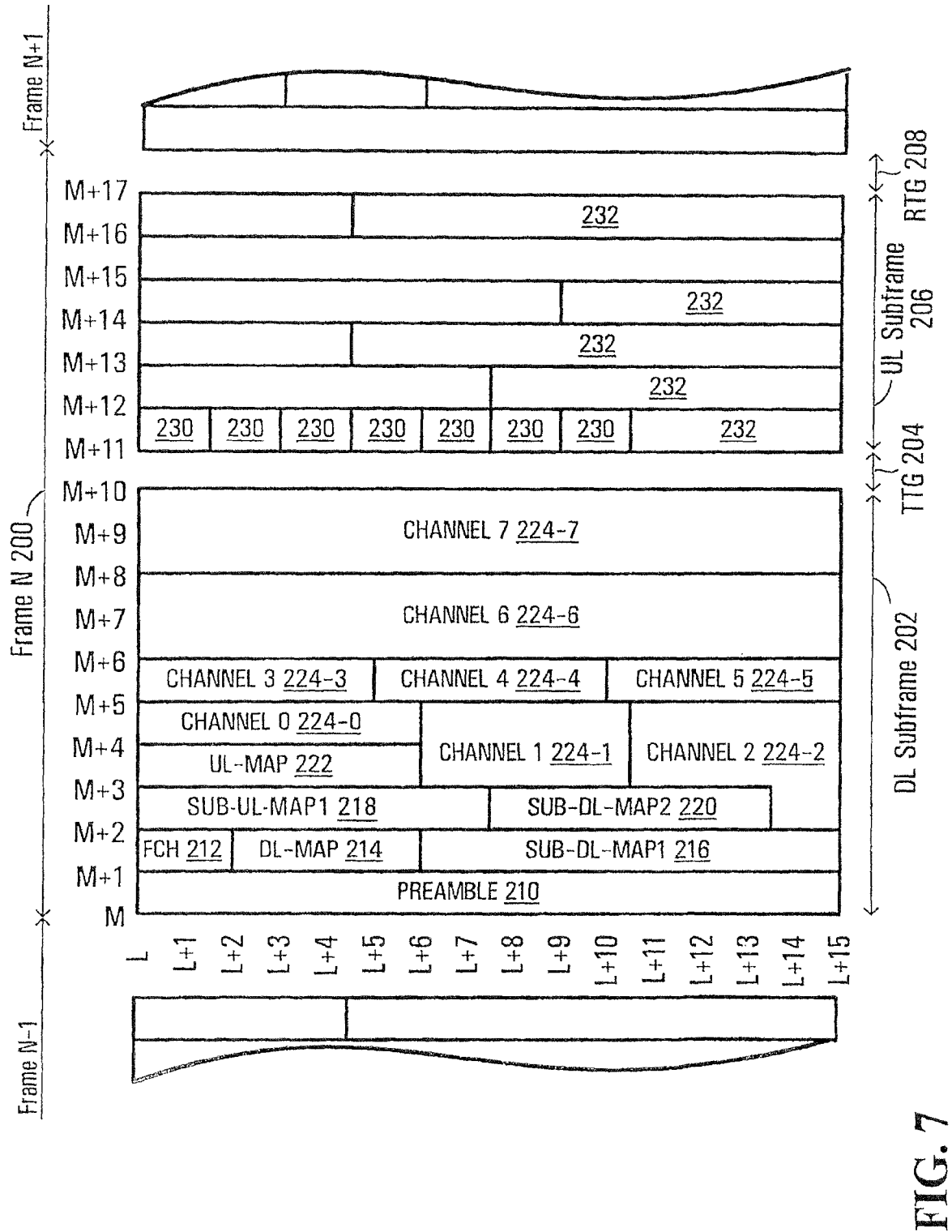
FIG. 7 is a schematic view of an OFDM frame for use with embodiments provided by the invention.

FIG. 7 shows a schematic diagram of an example frame used in conjunction with embodiments of the invention. Details are shown for a frame labeled "Frame N" 200 which is preceded by Frame "N−1" and followed by "Frame N+1", all of which form part of an ongoing sequence of frames. The Frame N 200 has a two dimensional appearance which is represented in terms of a rows and columns. The rows are designated by logical subchannel numbers L, L+1, . . . , L+15 and the columns are designated by OFDM symbol numbers M, M+1, . . . , M+17. Logical subchannels are designated groupings of active sub-carriers. Active sub-carriers are any one of data sub-carriers for data transmission, pilot sub-carriers for synchronization or sub-carriers that do not involve direct transmission, but are used as transition guards between parts of the frame.

A base station 14 provides a structure for frames, such as the Frame N 200 of FIG. 7, by transmitting messages on a broadcast connection to the mobile terminals 16 that are within range. The messages are known as Downlink Channel Descriptor (DCD) MAC management messages and Uplink Channel Descriptor (UCD) MAC management messages. UCD and DCD MAC management messages contain Type/Length/Value (TLV) encoded elements. Notably, UCD MAC management messages and DCD MAC management messages may be considered to be relatively long; UCD MAC management message length may be over 280 bytes and DCD MAC management message length may be over 200 bytes. MAC management messages on broadcast, basic or initial ranging connections are known to be neither fragmented nor packed. Therefore, it is necessary to transmit a long MAC management message all at once, that is, without fragmentation. The resource allocation for a long DCD/UCD message may be considered to be a burden for a base station 14, and the transmission of a long DCD/UCD message may be necessarily delayed if sufficient bandwidth is unavailable. Moreover, available resource in a frame may be less than that required to transmit a DCD/UCD MAC management message. As such, DCD/UCD messages are typically transmitted relatively infrequently.

The Frame N 200 of FIG. 7 includes a DL subframe 202, a transmit-receive transition guard (TTG) 204 and a UL subframe 206.

The DL subframe 202, as is typical, includes a preamble 210, a Frame Control Header (FCH) 212, a downlink (DL) mapping component (i.e., a DL-MAP 214) and an uplink (UL) mapping component (i.e., an UL-MAP 222). Furthermore, the DL subframe 202 includes two subsidiary DL mapping components (sub-DL-MAP1 216 and sub-DL-MAP2 220) and a subsidiary UL mapping component (sub- UL-MAP1 218). As is known, information elements in the DL-MAP 214 may reference information elements in the sub DL-MAPs 216, 220 and information elements in the sub DL-MAPs 216, 220 may reference locations in the resource space of the DL subframe 202. Similarly, information elements in the UL-MAP 222 may reference information elements in the sub-UL-MAP 218 and information elements in the sub-UL-MAP 218 may reference locations in the UL subframe 206.

The UL subframe 206 contains UL information allocated to designated regions 232 of the UL subframe in which specific mobile terminals 16 may transmit data back to the base station 14. The UL subframe 206 also includes fast feedback channels 230 that are used to allow the mobile terminals 16 to report information to the base station 14. For example, a fast feedback channel 230 can be designated as a channel to be used to indicate the air interface channel quality between the base station 14 and the mobile terminal 16.

Following the UL subframe 206 is a receive/transmit transition guard (RTG) 220. Frames N−1 and N+1 have a similar composition.

The data frame of FIG. 7 is an example of a time division duplex (TDD) data frame. It is to be understood that embodiments of the invention are also applicable to frequency division duplex (FDD) operation and OFDMA operation.

It is typical that much of the DL subframe 202 is a continuous resource space addressed by the DL-MAP 214, which includes information elements that refer to locations of resource units within the resource space. However, according to an embodiment of the invention, a structure for the resource space may be determined that involves dividing the resource space into a plurality of sub-resource spaces. Determining the structure for the resource space may involve defining the sub-resource spaces, called channels herein. The division of the resource space may, for instance, be based on measured traffic statistics.

Conventionally, when referencing resource units in the DL-MAP, each resource units is described by a DL-MAP Information Element which includes OFDMA symbol offset (8 bits), sub-channel offset (6 bits), number of OFDMA symbols (8 bits) and number of sub-channels (6 bits). By using such a mechanism, the minimum, or basic, DL resource unit is one sub-channel (or mini-sub-channel)×one OFMDA symbol. Assuming 20 mobile terminals are assigned DL resources in each frame, 560 bits in the DL-MAP will be used for region assignments. This results in large overhead.

Determining a definition for a given sub-resource space, or channel, may involve, in part, assigning a Channel InDex (CHID) to a region of the resource space of the DL subframe 202. Determining a given channel definition may also involve determining the geometry of the region of the DL subframe to be occupied by the given channel. Channel definitions, once determined, may then be broadcast in a DCD MAC management message.

Notably, while channel definitions can be updated and declared slowly through infrequent system configuration broadcast messages (e.g., DCD MAC management messages) channel definitions may also be updated and declared dynamically through resource allocation signaling (e.g., DL-MAP) on a per-frame basis or a few frame basis.

The DL subframe 202, as illustrated in FIG. 7, contains DL data in channels 224 of the DL subframe 202 to be transmitted to one or more mobile terminals 14. The channels 224 of the DL subframe 202 are identified as channel 0 224-0, channel 1 224-1, channel 2 224-2, channel 3 224-3, channel 4 224-4, channel 5 224-5, channel 6 224-6 and channel 7 224-7.

The resource space, and, consequently, the channels 224 of the DL subframe 202, is known to contain protocol data units (PDU). PDUs are known to include some or all of the following: a MAC header, MAC sub-headers and a MAC payload.

Figure 8:
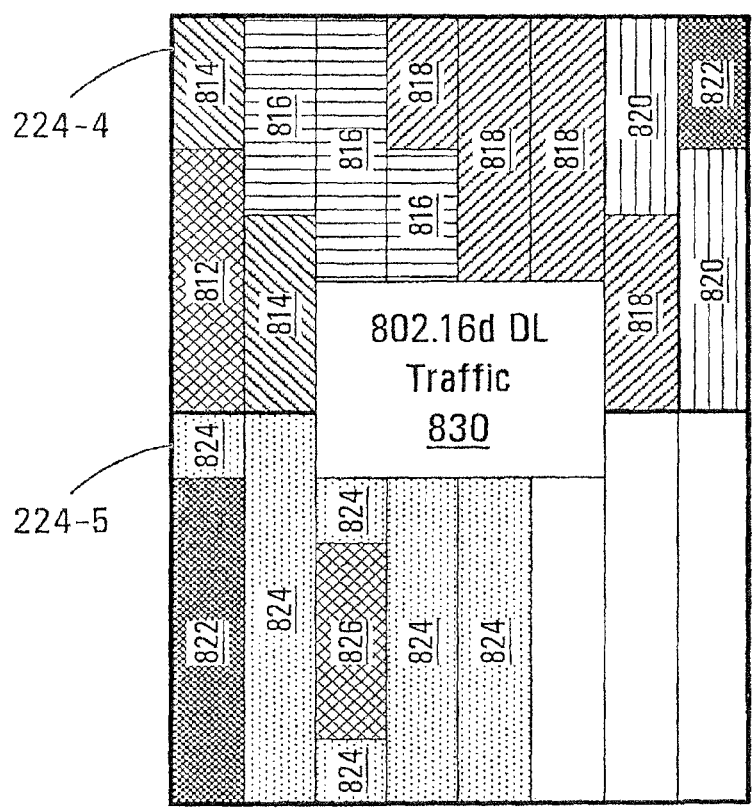
FIG. 8 illustrates exemplary allocations of sub-bursts to regions within the OFDM frame of FIG. 7.

Information elements included in the DL-MAP 214 or SUB-DL-MAP 216, 220 may be employed to indicate an allocation of a set of sub-channels and OFDM symbols, within a channel, for a particular sub-burst destined for a particular mobile terminal 16. Exemplary such allocations are illustrated in FIG. 8 for channel 4 224-4 and channel 5 224-5. Channel 4 224-4 includes sub-bursts 812, 814, 816, 818, 820 and 822. Channel 5 224-5 includes sub-bursts 822, 824 and 826. Both channel 4 224-4 and channel 5 224-5 include some 802.16D DL traffic 830.

As shown in FIG. 8, each channel may include multiple sub-bursts and each sub-burst may be mapped into to the channel following the known frequency-first-one-dimension mapping rule. If some part of a channel is partially occupied (for example by MAPs and 802.16D DL traffic or any other assignment using a regular IE), the frequency-first-one-dimension mapping rule is still valid.

It is proposed herein that a PHY PDU associated with a mobile terminal 16 may be mapped to more than one channel. An example is illustrated in FIG. 8 wherein insufficient room is left in channel 4 224-4 to schedule an entire PDU. The final sub-burst 822 of channel 4 224-4 may be mapped to channel 5 224-5.

It is also proposed herein to allow a PHY PDU associated with a mobile terminal 16 to be non-consecutively mapped. For example, some slots may be reserved for certain transmissions, including retransmissions. An example is illustrated in FIG. 8 wherein an intervening sub-burst 826 is allocated to slots among slots that are allocated to a long sub-burst 824.

It is further proposed that a mobile terminal 16 may prevent unnecessary MAP processing by introducing a "done" bit.

It is proposed herein to allow each sub-burst (or layer in MIMO) to use distinct Downlink Interval Usage Code (DIUC), repetition and boosting. The related overhead can be reduced by introducing a transmission control group. A transmission control group may, for example, include all sub-bursts that use the same DIUC, boosting and repetition to use one DIUC/boosting/repetition transmission code for the entire transmission control group of sub-bursts.

Figure 9:
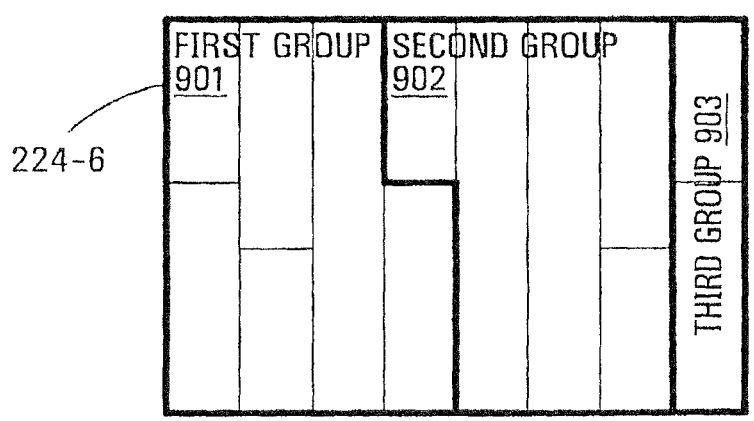
FIG. 9 illustrates an exemplary grouping of sub-bursts in a region within the OFDM frame of FIG. 7.

FIG. 9 illustrates an exemplary grouping. A first group 901 includes Normal mode sub-bursts, a second group 902 includes Chase sub-bursts and a third group 903 includes Chase Combining-Incremental Redundancy (CC-IR) sub-bursts.

Advantages of the above embodiments of the invention include a reduction of overhead. As discussed above, each region assignment, that is, assignment of a location for a sub-burst in the DL subframe 202, in a resource space that has not been divided into channels, may require 28 bits. In contrast, region assignment for the DL subframe 202 in a resource space that has been divided into channels may be shown to require fewer than 6 bits. Furthermore, the possibility of un-utilized resource at the end of a channel is minimized through the allowance of mapping a PDU across a channel boundary.

The above embodiments may be implemented through the use of the following exemplary enhanced format for a DL assignment DL MAP information element.

| Syntax | Size (bits) | Note |
|---|---|---|
| Enhanced DL Assignment DL MAP IE { | | |
|   Extended DIUC | 4 | Set to 0x1 |
|   Length | 8 | Length of the IE in bytes |
|   RCID_Type | 2 | 00 = Normal CID |
| | | 01 = RCID11 |
| | | 10 = RCID7 |
| | | 11 = CID not included |
|   CHID | Variable | As defined in TLV in DCD. |
|   Boosting | 3 | |
|   Num_sub_burst | 4 | |
|   For (j = 0; j<Num_sub_burst;j++) | | |
|   { | | |
|     Mode | 3 | Indicates the mode of this sub_burst |
| | | 0000 = Normal |
| | | 0001 = Chase H-ARQ |
| | | 0010 = IR CC H-ARQ |
| | | 0011 = OL MIMO |
| | | 0100 = OL MIMO Chase H-ARQ |
| | | 0101 = OL MIMO IR CC H-ARQ |
| | | 0110 = STC H-ARQ |
| | | 0111 = Normal-CTC |
| | | 1000 = OL MIMO-CTC |
| | | 1001 = OL MIMO IR CTC H-ARQ |
| | | 1010 = CL MIMO |
| | | 1011 = CL MIMO (CTC) |
| | | 1100 = CL MIMO Chase H-ARQ |
| | | 1101 = CL MIMO IR CC H-ARQ |
| | | 1110 = CL MIMO IR CTC H-ARQ |
| | | 1111 = reserved |
|     If (Mode==0000) { | | |
|       Normal Sub-Burst IE ( ) | Variable | |
|     } else if ( Mode == 0001) { | | |
|       Chase H-ARQ Sub-Burst IE ( ) | Variable | |
|     } else if (Mode == 0010) { | | |
|       IR CC H-ARQ Sub-Burst IE ( ) | Variable | |
|     } else if (Mode == 0011) { | | |
|       MIMO Sub-Burst IE ( ) | Variable | |
|     } else if (Mode == 0100) { | | |
|       MIMO Chase H-ARQ Sub-Burst IE | Variable | |
|     } else if (Mode == 0101) { | | |
|       MIMO IR CC H-ARQ Sub-Burst IE | Variable | |
|     } else if (Mode == 0110) { | | |
|       CTC H-ARQ Sub_Burst IE | Variable | |
|     } else if (Mode == 0111) { | | |
|       Normal-CTC Sub-Burst IE ( ) | Variable | |
|     } else if (Mode == 1000) { | | |
|       MIMO CTC Sub-Burst IE ( ) | Variable | |
|     } else if (Mode == 1001) { | | |
|       MIMO IR CTC H-ARQ Sub-Burst IE | Variable | |
|     } | | |
|   } (end of Sub_burst loop) | | |
|   Padding | | |
| } | | |

The enhanced information element format for DL assignment DL MAP references a normal sub-burst IE format (mode=0000). An exemplary normal sub-burst IE format follows.

| Syntax | Size | Note |
|---|---|---|
| Normal Sub-Burst IE { | | |
|   Start_offset_indicator | 1 bit | Set to 1 if the start offset for this sub-burst (relative to the |

| Syntax | Size | Note |
|---|---|---|
| | | beginning of this channel) needs to be indicated; Set to 0 if the start offset of the sub-burst is the end of the previous sub-burst. |
| If ( Start_offset_indicator == 1 ) {   Start_offset | Variable | As defined in DL Channel Definition TLV in DCD management massage |
| } Length | Variable | As defined in DL Channel Definition TLV in DCD management massage |
| If (RCID_Type != 11) {   RCID_IE } | Variable | |
| DIUC | 4 bits | |
| Repetition | 2 bits | |
| Done_indicator | 1 bit | Set to 1 to indicate that there is no further unicast assignment to this mobile terminal in this frame. At this point, the mobile terminal may stop further process of the following MAPs. |
| } | | |

The enhanced information element format for DL assignment DL MAP references a Chase Hybrid Automatic Request (H-ARQ) sub-burst IE format (mode=0001). An exemplary Chase H-ARQ sub-burst IE format follows.

| Syntax | Size | Note |
|---|---|---|
| Chase H-ARQ Sub-Burst IE { | | |
|   Start_offset_indicator | 1 bit | Set to 1 if the start offset for this sub-burst ( relative to the beginning of this channel) needs to be indicated; Set to 0 if the start offset of the sub-burst is the end of the previous sub-burst. |
| If ( Start_offset_indicator == 1 ) {   Start_offset | Variable | In slot. As defined in DL Channel Definition TLV (Type = 19) in DCD management massage |
| } Length | Variable | In slot. As defined in DL Channel Definition TLV (Type = 19) in DCD management massage |
| RCID_IE | Variable | |
| DIUC | 4 bits | |
| Repetition | 2 bits | |
| ACID | 4 bits | |
| AI_SN | 1 bit | Each change in AI_SN indicates a new packet transmission on the same H-ARQ channel identified by ACID |
| Done_indicator | 1 bit | Set to 1 to indicate that there is no further unicast assignment to this mobile terminal in this frame. At this point, the mobile terminal may stop further process of the following MAPs. |
| } | | |

The enhanced information element format for DL assignment DL MAP references a Incremental Redundancy (IR) Chase Combining (CC) H-ARQ sub-burst IE format (mode=0010). An exemplary IR CC H-ARQ sub-burst IE format follows.

| Syntax | Size | Note |
|---|---|---|
| IR CC H-ARQ Sub-Burst IE { | | |
|   Start_offset_indicator | 1 bit | Set to 1 if the start offset for this sub-burst ( relative to the beginning of this channel) needs to be indicated; Set to 0 if the start offset of the sub-burst is the end of the previous sub-burst. |
|   If (Start_offset_indicator == 1) { | | |
|     Start_offset | Variable | As defined in DL Channel Definition TLV (Type = 19) in DCD management massage |
|   } | | |
|   Length | Variable | As defined in DL Channel Definition TLV (Type = 19) in DCD management massage |
|   RCID_IE | Variable | |
|   ACID | 4 bits | |
|   AI_SN | 1 bit | Each change in AI_SN indicates a new packet transmission on the same H-ARQ channel identified by ACID |
|   SPID | 2 bits | |
|   Done_indicator | 1 bit | Set to 1 to indicate that there is no further unicast assignment to this mobile terminal in this frame. At this point, the mobile terminal may stop further process of the following MAPs. |
| } | | |

The enhanced information element format for DL assignment DL MAP references a MIMO sub-burst IE format (mode=0011). An exemplary MIMO sub-burst IE format follows.

| Syntax | Size | Note |
|---|---|---|
| MIMO Sub-Burst IE { | | |
|   Start_offset_indicator | 1 bit | Set to 1 if the start offset for this sub-burst (relative to the beginning of this channel) needs to be indicated; Set to 0 if the start offset of the sub-burst is the end of the previous sub-burst. |
|   If ( Start_offset_indicator == 1 ) { | | |
|     Start_offset | Variable | As defined in DL Channel Definition TLV (Type = 19) in DCD management massage |
|   } | | |
|   Length | Variable | As defined in DL Channel Definition TLV (Type = 19) in DCD management massage |
|   Matrix_index | 2 bits | |
|   Num_MSSs | 2 bits | |
|   For (i = 0; i < Num_MSSs; i++) { | | |
|     If (RCID_Type 1!= 11) { | | |
|       RCID_IE | Variable | |
|     } | | |
|     Num_layer | 2 bits | |
|     For (j = 0 ; j < Num_layer; j++) { | | |
|       Layer_index | 2 bits | |
|       DIUC | 4 bits | |
|       Repetition Coding Indication | 2 bits | |
|     } | | |
|     Done_indicator | 1 bit | Set to 1 to indicate that there is no further unicast assignment to |

| Syntax | Size | Note |
|---|---|---|
| } } | | this mobile terminal in this frame. At this point, the mobile terminal may stop further process of the following MAPs. |

The enhanced information element format for DL assignment DL MAP references a MIMO Chase H-ARQ sub-burst IE format (mode=0100). An exemplary MIMO Chase H-ARQ sub-burst IE format follows.

| Syntax | Size | Note |
|---|---|---|
| MIMO Chase H-ARQ Sub-Burst IE { | | |
|   Start_offset_indicator | 1 bit | Set to 1 if the start offset for this sub-burst ( relative to the beginning of this channel) needs to be indicated; Set to 0 if the start offset of the sub-burst is the end of the previous sub-burst. |
|   If ( Start_offset_indicator == 1 ) { | | |
|     Start_offset | Variable | As defined in DL Channel Definition TLV (Type = 19) in DCD management massage |
|   } | | |
|   Length | variable | As defined in DL Channel Definition TLV (Type = 19) in DCD management massage |
|   Matrix_index | 2 bits | |
|   Num_MSSs | 2 bits | |
|   For (i = 0; i < Num_MSSs; i++) { | | |
|     RCID_IE | Variable | |
|     Num_layer | 2 bits | |
|     For (j = 0 ; j < Num_layer; j++) { | | |
|       Layer_index | 2 bits | |
|       DIUC | 4 bits | |
|       Repetition Coding Indication | 2 bits | |
|       ACID | | |
|       AI_SN | | Each change in AI_SN indicates a new packet transmission on the same H-ARQ channel identified by ACID |
|     } | | |
|     Done_indicator | 1 bit | Set to 1 to indicate that there is no further unicast assignment to this mobile terminal in this frame. At this point, the mobile terminal may stop further process of the following MAPs. |
|   } } | | |

The enhanced information element format for DL assignment DL MAP references a MIMO IR CC H-ARQ sub-burst IE format (mode=0101). An exemplary MIMO IR CC H-ARQ sub-burst IE format follows.

| Syntax | Size | Note |
|---|---|---|
| MIMO IR CC H-ARQ Sub-Burst IE { | | |
|   Start_offset_indicator | 1 bit | Set to 1 if the start offset for this sub-burst (relative to the beginning of this channel) needs to be indicated; Set to 0 if the start offset of the sub-burst is the end of the previous sub-burst. |

| Syntax | Size | Note |
|---|---|---|
| If ( Start_offset_indicator == 1 ) { | | |
|   Start_offset | Variable | As defined in DL Channel Definition TLV (Type = 19) in DCD management massage |
| } | | |
| Length | Variable | As defined in DL Channel Definition TLV (Type = 19) in DCD management massage |
| Matrix_index | 2 bit | |
| Num_MSSs | 2 bits | |
| For (i = 0; I < Num_MSSs; i++) { | | |
|   RCID_IE | Variable | |
|   Num_layer | 2 bits | |
|   For (j = 0 ; j < Num_layer; j++) { | | |
|     Layer_index | 2 bits | |
|     DIUC | 4 bits | |
|     Repetition Coding Indication | 2 bits | |
|     ACID | 2 bits | |
|     AI_SN | 1 bit | Each change in AI_SN indicates a new packet transmission on the same H-ARQ channel identified by ACID |
|     SPID | 2 bits | |
|   } | | |
|   Done_indicator | 1 bit | Set to 1 to indicate that there is no further unicast assignment to this mobile terminal in this frame. At this point, the mobile terminal may stop further process of the following MAPs. |
| } | | |
| } | | |

The enhanced information element format for DL assignment DL MAP references a STC H-ARQ sub-burst IE format (mode=0110). An exemplary STC H-ARQ sub-burst IE format follows.

| Syntax | Size | Note |
|---|---|---|
| STC H-ARQ Sub-Burst IE { | | |
|   Start_offset_indicator | 1 bit | Set to 1 if the start offset for this sub-burst (relative to the beginning of this channel) needs to be indicated; Set to 0 if the start offset of the sub-burst is the end of the previous sub-burst. |
| If ( Start_offset_indicator == 1 ) { | | |
|   Start_offset | Variable | As defined in DL Channel Definition TLV (Type = 19) in DCD management massage |
| } | | |
| Length | Variable | As defined in DL Channel Definition TLV (Type = 19) in DCD management massage |
| If (RCID_Type 1!= 11) { | | |
|   RCID_IE | Variable | |
| } | | |
| ACID | 2 bits | |
| Num_transmission | 2 bits | 00 - the first transmission<br>01 - the second transmission<br>10 - the third transmission<br>11 - the fourth transmission |
| If (Num_transmission == 00 ) { | | |
|   DIUC | 4 bits | |
|   Repetition Coding Indication | 2 bits | |
| } | | |
| Done_indicator | 1 bit | Set to 1 to indicate that there is no further unicast assignment to this |

| Syntax | Size | Note |
|---|---|---|
| | | mobile terminal in this frame. At this point, the mobile terminal may stop further process of the following MAPs. |
| } | | |

The enhanced information element format for DL assignment DL MAP references a Normal Convolution Turbo Code (CTC) sub-burst IE format (mode=0111). An exemplary Normal CTC sub-burst IE format follows.

| Syntax | Size | Note |
|---|---|---|
| Normal CTC Sub-Burst IE { | | |
|     Start_offset_indicator | 1 bit | Set to 1 if the start offset for this sub-burst (relative to the beginning of this channel) needs to be indicated; Set to 0 if the start offset of the sub-burst is the end of the previous sub-burst. |
|     If ( Start_offset_indicator == 1 ) { | | |
|         Start_offset | Variable | As defined in DL Channel Definition TLV (Type = 19) in DCD management massage |
|     } | | |
|     If (RCID_Type 1!= 11) { | | |
|         RCID_IE | Variable | |
|     } | | |
|     Nsch | | |
|     Nep | 4 bits | |
|     Done_indicator | 1 bit | Set to 1 to indicate that there is no further unicast assignment to this mobile terminal in this frame. At this point, the mobile terminal may stop further process of the following MAPs. |
| } | | |

The enhanced information element format for DL assignment DL MAP references a MIMO CTC sub-burst IE format (mode=1000). An exemplary MIMO CTC sub-burst IE format follows.

| Syntax | Size | Note |
|---|---|---|
| MIMO CTC Sub-Burst IE { | | |
|     Start_offset_indicator | 1 bit | Set to 1 if the start offset for this sub-burst (relative to the beginning of this channel) needs to be indicated; Set to 0 if the start offset of the sub-burst is the end of the previous sub-burst. |
|     If ( Start_offset_indicator == 1 ) { | | |
|         Start_offset | Variable | As defined in DL Channel Definition TLV (Type = 19) in DCD management massage |
|     } | | |
|     Nsch | 4 bits | |
|     Matrix_index | 2 bit | |
|     Num_MSSs | 2 bits | |
|     For (i = 0; i < Num_MSSs; i++) { | | |
|         If (RCID_Type 1!= 11) { | | |
|             RCID_IE | Variable | |
|         } | | |
|         Num_layer | 2 bits | |
|         For (j = 0 ; j < Num_layer; j++) { | | |
|             Layer_index | 2 bits | |
|             Nep | 4 bits | |

-continued

| Syntax | Size | Note |
| --- | --- | --- |
| } | | |
| } | | |
| Done_indicator | 1 bit | Set to 1 to indicate that there is no further unicast assignment to this mobile terminal in this frame. At this point, the mobile terminal may stop further process of the following MAPs. |
| } | | |

The enhanced information element format for DL assignment DL MAP references a MIMO IR CTC H-ARQ sub-burst IE format (mode=1001). An exemplary MIMO IR CTC H-ARQ sub-burst IE format follows.

| Syntax | Size | Note |
| --- | --- | --- |
| MIMO IR CTC H-ARQ Sub-Burst IE { | | |
|   Start_offset_indicator | 1 bit | Set to 1 if the start offset for this sub-burst (relative to the beginning of this channel) needs to be indicated; Set to 0 if the start offset of the sub-burst is the end of the previous sub-burst. |
|   If ( Start_offset_indicator == 1 ) { | | |
|     Start_offset | Variable | As defined in DL Channel Definition TLV (Type = 19) in DCD management massage |
|   } | | |
|   Nsch | 4 bits | |
|   If (RCID_Type 1!= 11) { | | |
|     RCID_IE | Variable | |
|   } | | |
|   Matrix_index | 2 bits | |
|   Num_layer | 2 bits | |
|   For ( I =0;i< Num_layer; i++ ) { | | |
|     Nep | 4 bits | |
|   } | | |
|   ACID | 2 bits | |
|   AI_SN | 1 bit | |
|   SPID | 2 bits | |
|   Done_indicator | 1 bit | Set to 1 to indicate that there is no further unicast assignment to this mobile terminal in this frame. At this point, the mobile terminal may stop further process of the following MAPs. |
| } | | |

The enhanced information element format for DL assignment DL MAP references a Closed Loop (CL) MIMO sub-burst IE format (mode=1010). An exemplary CL MIMO sub-burst IE format follows.

| Syntax | Size | Note |
| --- | --- | --- |
| CL MIMO Sub-Burst IE { | | |
|   Start_offset_indicator | 1 bit | Set to 1 if the start offset for this sub-burst (relative to the beginning of this channel) needs to be indicated; Set to 0 if the start offset of the sub-burst is the end of the previous sub-burst. |
|   If ( Start_offset_indicator == 1 ) { | | |
|     Start_offset | Variable | As defined in DL Channel Definition TLV (Type = 19) in DCD management massage |
|   } | | |

-continued

| Syntax | Size | Note |
|---|---|---|
| Length | variable | As defined in DL Channel Definition TLV (Type = 19) in DCD management massage |
| CL MIMO mode | 2 bits | 00 - Antenna selection<br>01 - Antenna grouping<br>10 - SVD<br>11 - reserved |
| If (CL MIMO mode == 00 ) { | | |
|   Num_MSS | 2 bits | |
|   For ( i = 0; i < Num_MSS; i++ ) { | | |
|     If (RCID_Type !=11 ) { | | |
|       RCID_IE | Variable | |
|     } | | |
|     Num_antenna | 2 bits | |
|     For (j = 0; j < Num_antenna; j++) { | | |
|       Antenna_index | 2 bits | |
|       DIUC | 4 bits | |
|       Repetition Coding Indication | 2 bits | |
|     } | | |
|     Done_indicator | 1 bit | |
|   } | | |
| } else if (CL MIMO mode == 01 ) { | | |
|   If (RCID_Type !=11 ) { | | |
|     RCID_IE | Variable | |
|   } | | |
|   Antenna group matrix index | 4 bits | |
|   For (j = 0; j < Num_alayer; j++) { | | Number of layer is implicitly indicated by the matrix index |
|     DIUC | 4 bits | |
|     Repetition Coding Indication | 2 bits | |
|   } | | |
|   Done_indicator | 1 bit | |
| } else if ( CL MIMO mode == 10 ) { | | |
|   If (RCID_Type !=11 ) { | | |
|     RCID_IE | Variable | |
|   } | | |
|   DIUC | 4 bits | |
|   Repetition | 2 bits | |
|   Done_indicator | 1 bit | |
|   } | | |
| } | | |

The enhanced information element format for DL assignment DL MAP references a CL MIMO (CTC) sub-burst IE format (mode=1011). An exemplary CL MIMO (CTC) sub-burst IE format follows.

| Syntax | Size | Note |
|---|---|---|
| CL MIMO (CTC) Sub-Burst IE { | | |
|   Start_offset_indicator | 1 bit | Set to 1 if the start offset for this sub-burst (relative to the beginning of this channel) needs to be indicated;<br>Set to 0 if the start offset of the sub-burst is the end of the previous sub-burst. |
|   If ( Start_offset_indicator == 1 ) { | | |
|     Start_offset | Variable | As defined in DL Channel Definition TLV (Type = 19) in DCD management massage |
|   } | | |
|   Nsch | variable | As defined in DL Channel Definition TLV (Type = 19) in DCD management massage |
|   CL MIMO mode | 2 bits | 00—Antenna selection<br>01—Antenna grouping<br>10—SVD<br>11—reserved |
|   If (CL MIMO mode == 00 ) { | | |
|     Num_MSS | 2 bits | |

-continued

| Syntax | Size | Note |
|---|---|---|
|     For ( I = 0; I < Num_MSS; i++ ) { | | |
|         If (RCID_Type !=11 ) { | | |
|             RCID_IE | Variable | |
|         } | | |
|         Num_antenna | 2 bits | |
|         For (j = 0; j < Num_antenna; j++) { | | |
|             Antenna_index | 2 bits | |
|             Nep | 4 bits | |
|         } | | |
|         Done_indicator | 1 bit | |
|     } | | |
| } else if (CL MIMO mode == 01 ) { | | |
|     If (RCID_Type !=11 ) { | | |
|         RCID_IE | Variable | |
|     } | | |
|     Antenna group index | 4 bits | Definition |
|     For (j = 0; j < Num_alayer; j++) { | | Number of layer is implicitly indicated by the matrix index |
|         Nep | 4 bits | |
|     } | | |
|     Done_indicator | 1 bit | |
| } | | |
| } else if ( CL MIMO mode == 10 ) { | | |
|     If (RCID_Type !=11 ) { | | |
|         RCID_IE | Variable | |
|     } | | |
|     Nep | 4 bits | |
|     Done_indicator | 1 bit | |
|     } | | |
| } | | |

The enhanced information element format for DL assignment DL MAP references a CL MIMO Chase H-ARQ sub-burst IE format (mode=1100). An exemplary CL MIMO Chase H-ARQ sub-burst IE format follows.

| Syntax | Size | Note |
|---|---|---|
| CL MIMO Chase H-ARQ Sub-Burst IE { | | |
|     Start_offset_indicator | 1 bit | Set to 1 if the start offset for this sub-burst (relative to the beginning of this channel) needs to be indicated; Set to 0 if the start offset of the sub-burst is the end of the previous sub-burst. |
|     If ( Start_offset_indicator == 1 ) { | | |
|         Start_offset | Variable | As defined in DL Channel Definition TLV (Type = 19) in DCD management massage |
|     } | | |
|     Length | variable | As defined in DL Channel Definition TLV (Type = 19) in DCD management massage |
|     CL MIMO mode | 2 bits | 00—Antenna selection 01—Antenna grouping 10—SVD 11—reserved |
|     If (CL MIMO mode == 00 ) { | | |
|         Num_MSS | 2 bits | |
|         For ( i = 0; i < Num_MSS; i++ ) { | | |
|             If (RCID_Type !=11 ) { | | |
|                 RCID_IE | Variable | |
|             } | | |
|             Num_antenna | 2 bits | |
|             For (j = 0; j < Num_antenna; j++) { | | |
|                 Antenna_index | 2 bits | |
|                 DIUC | 4 bits | |
|                 Repetition Coding Indication | 2 bits | |
|                 ACID | 2 bits | |

| Syntax | Size | Note |
|---|---|---|
|       AI_SN | 1 bit | |
|     } | | |
|     Done_indicator | 1 bit | |
|   } | | |
| } else if (CL MIMO mode == 01 ) { | | |
|   If (RCID_Type !=11 ) { | | |
|     RCID_IE | Variable | |
|   } | | |
|   Antenna group index | 3 bits | Definition |
|   For (j = 0; j < Num_alayer; j++) { | | Number of layer is implicitly indicated by the matrix index |
|     DIUC | 4 bits | |
|     Repetition Coding Indication | 2 bits | |
|     ACID | 2 bits | |
|     AI_SN | 1 bit | |
|   } | | |
|   Done_indicator | 1 bit | |
| } else if ( CL MIMO mode == 10 ) { | | |
|   If (RCID_Type !=11 ) { | | |
|     RCID_IE | Variable | |
|   } | | |
|   DIUC | 4 bits | |
|   Repetition | 2 bits | |
|   ACID | 2 bits | |
|   AI_SN | 1 bit | |
|   Done indicator | 1 bit | |
| } | | |
| } | | |

The enhanced information element format for DL assignment DL MAP references a CL MIMO CC H-ARQ sub-burst IE format (mode=1101). An exemplary CL MIMO CC H-ARQ sub-burst IE format follows.

| Syntax | Size | Note |
|---|---|---|
| CL MIMO CC H-ARQ Sub-Burst IE { | | |
|   Start_offset_indicator | 1 bit | Set to 1 if the start offset for this sub-burst (relative to the beginning of this channel) needs to be indicated; Set to 0 if the start offset of the sub-burst is the end of the previous sub-burst. |
|   If ( Start_offset_indicator == 1 ) { | | |
|     Start_offset | Variable | As defined in DL Channel Definition TLV (Type = 19) in DCD management massage |
|   } | | |
|   Length | variable | As defined in DL Channel Definition TLV (Type = 19) in DCD management massage |
|   CL MIMO mode | 2 bits | 00—Antenna selection<br>01—Antenna grouping<br>10—SVD<br>11—reserved |
|   If (CL MIMO mode == 00 ) { | | |
|     Num_MSS | 2 bits | |
|     For ( I = 0; I < Num_MSS; i++ ) { | | |
|       If (RCID_Type !=11 ) { | | |
|         RCID_IE | Variable | |
|       } | | |
|       Num_antenna | 2 bits | |
|       For (j = 0; j < Num_antenna; j++) { | | |
|         Antenna_index | 2 bits | |
|         DIUC | 4 bits | |
|         Repetition Coding Indication | 2 bits | |
|         ACID | 2 bits | |
|         AI_SN | 1 bit | |
|         SPID | 2 bits | |

| Syntax | Size | Note |
|---|---|---|
| } | | |
|     Done_indicator | 1 bit | |
| } | | |
| } else if (CL MIMO mode == 01 ) { | | |
|   If (RCID_Type !=11 ) { | | |
|     RCID_IE | Variable | |
|   } | | |
| Antenna group index | 4 bits | Definition |
| For (j = 0; j < Num_alayer; j++) { | | Number of layer is implicitly indicated by the matrix index |
|   DIUC | 4 bits | |
|   Repetition Coding Indication | 2 bits | |
|   ACID | 2 bits | |
|   AI_SN | 1 bit | |
|   SPID | 2 bits | |
| } | | |
| Done_indicator | 1 bit | |
| } else if ( CL MIMO mode == 10 ) { | | |
|   If (RCID_Type !=11 ) { | | |
|     RCID_IE | Variable | |
|   } | | |
|   DIUC | 4 bits | |
|   Repetition | 2 bits | |
|   ACID | 2 bits | |
|   AI_SN | 1 bit | |
|   SPID | 1 bit | |
|   Done indicator | 1 bit | |
| } | | |
| } | | |

The enhanced information element format for DL assignment DL MAP references a CL MIMO IR CTC H-ARQ sub-burst IE format (mode=1110). An exemplary CL MIMO IR CTC H-ARQ sub-burst IE format follows.

| Syntax | Size | Note |
|---|---|---|
| CL MIMO IR CTC H-ARQ Sub-Burst IE { | | |
|   Start_offset_indicator | 1 bit | Set to 1 if the start offset for this sub-burst (relative to the beginning of this channel) needs to be indicated; Set to 0 if the start offset of the sub-burst is the end of the previous sub-burst. |
|   If (Start_offset_indicator == 1 ) { | | |
|     Start_offset | Variable | As defined in DL Channel Definition TLV (Type = 19) in DCD management massage |
|   } | | |
|   Nsch | variable | As defined in DL Channel Definition TLV (Type = 19) in DCD management massage |
|   CL MIMO mode | 2 bits | 00—Antenna selection<br>01—Antenna grouping<br>10—SVD<br>11—reserved |
|   If (CL MIMO mode == 00 ) { | | |
|     Num_MSS | 2 bits | |
|     For ( i = 0; I < Num_MSS; i++ ) { | | |
|       If (RCID_Type !=11 ) { | | |
|         RCID_IE | Variable | |
|       } | | |
|       Num_antenna | 2 bits | |
|       For (j = 0; j < Num_antenna; j++) { | | |
|         Antenna_index | 2 bits | |
|         Nep | 4 bits | |
|         ACID | 4 bits | |
|         AI_SN | 1 bit | |
|         SPID | 2 bits | |

| Syntax | Size | Note |
|---|---|---|
|     } | | |
|     Done_indicator | 1 bit | |
|   } | | |
| } else if (CL MIMO mode == 01 ) { | | |
|   If (RCID_Type !=11 ) { | | |
|     RCID_IE | Variable | |
|   } | | |
|   Antenna group index | 3 bits | Definition |
|   For (j = 0; j < Num_alayer; j++) { | | Number of layer is implicitly indicated by the matrix index |
|     Nep | 4 bits | |
|   } | | |
|   ACID | 4 bits | |
|   AI_SN | 1 bit | |
|   SPID | 2 bit | |
|   Done_indicator | 1 bit | |
| } else if ( CL MIMO mode == 10 ) { | | |
|   If (RCID_Type !=11 ) | | |
|     RCID_IE | Variable | |
|   } | | |
|   Nep | 4 bits | |
|   ACID | 4 bits | |
|   AI_SN | 1 bit | |
|   SPID | 2 bits | |
|   Done_indicator | 1 bit | |
|   } | | |
| } | | |

In overview, using a two-step process, it may be shown that the total overhead involved in resource allocation may be reduced as compared to known resource allocation methods. In the first step, the base station 14 defines a plurality of sub-resource spaces within a communication resource space. When performing subsequent resource allocation, the base station may refer to the sub-resource space for the allocation rather than describing in full the location within the resource. In particular, while the sub-resource spaces may be defined relatively infrequently in DCD messages, the allocation of the sub-resources spaces may be updated relatively frequently in scheduling messages.

As discussed above, a frame may be considered to have a resource. According to an aspect of the present invention, a mapping component of the frame (e.g., a DL-MAP) may include information elements that define a plurality of channels. It has been proposed above to define the plurality of channels as occupying the resource in a contiguous manner. It is proposed in the following to define the channels as occupying the resource in a overlapping manner. To this end, the channels may be defined to be in a hierarchy of layers, where each successively defined layer has a plurality of channels with a channel size that is smaller than the channel size of the channels of the previous layer.

Given that the resource may be considered to be made up of resource units, the minimum size for a channel in this hierarchical scheme may be predetermined as the size of the smallest resource unit.

FIG. 10 illustrates a frame of channels defined using a hierarchical channel definition scheme, such that the frame is organized into five depths. At depth 1, a first channel 1000 (channel ID=00000) occupies the entirety of the available resource. At depth 2, two channels 1001, 1002 (channel ID=00001, 00010) each occupy a half of the available resource. At depth 4, four channels 1003, 1004, 1005, 1006 (channel ID=00011, 00100, 00101, 00110) each occupy a quarter of the available resource. At depth 8, eight channels 1007, 1008, 1009, 1010, 1011, 1012, 1013, 1014 (channel ID=00111, 01000, 01001, 01010, 01011, 01100, 01101, 01110) each occupy an eighth of the available resource. At depth 16, 16 channels 1015, 1016, 1017, 1018, 1019, 1020, 1021, 1022, 1023, 1024, 1025, 1026, 1027, 1028, 1029, 1030 (channel ID=01111, 10000, 10001, 10010, 10011, 10100, 10101, 10110, 10111, 11000, 11001, 11010, 11011, 11100, 11101, 11110) each occupy a sixteenth of the available resource. Notably, in this exemplary case, the smallest resource unit is a sixteenth of the available resource. Furthermore, the bit-length of the channel ID, that is, the number of bits required to uniquely identify each channel in the scheme, may be determined by adding one to the base-2 logarithm of the maximum depth.

The maximum depth for the hierarchical channel definition scheme in the example of FIG. 10 is 16. The bit-length of the channel ID may, therefore, be determined as $\log_2 (16)+1=5$ bits.

Although the channel definitions overlap, allocation of resources to various channels need not overlap. FIG. 11 illustrates a scenario in which only a limited number of hierarchically defined channels are allocated. In particular, the allocated channels include: a first quarter-resource space channel (CHID=00011) 1103; a second quarter-resource space channel (CHID=00100) 1104; a third quarter-resource space channel (CHID=00101) 1105; a first sixteenth-resource space channel (CHID=11001) 1125; a second sixteenth-resource space channel (CHID=11010) 1126; a third sixteenth-resource space channel (CHID=11101) 1129; and a fourth sixteenth-resource space channel (CHID=11110) 1130.

That being said, resources may also be allocated to overlapping channels, as illustrated in FIG. 12, wherein the allocated channels in the resource space 1200 include: a first quarter-resource space channel (CHID=00011) 1203; a second quarter-resource space channel (CHID=00100) 1204; a third quarter-resource space channel (CHID=00101) 1205; a fourth quarter-resource space channel (CHID=00110) 1206; and a sixteenth-resource space channel (CHID=10100)

1220. Notably, since the sixteenth-resource space channel 1220 overlaps the first quarter-resource space channel 1203, the allocation of first quarter-resource space channel 1203 is understood to only relate to the region of the resource not allocated to the sixteenth-resource space channel 1220.

In a non-hierarchical channel definition scheme, the available resource may be divided into multiple channels of non-uniform size. The non-uniform size of the channels may be based, for instance, on traffic statistics. Notably, the non-uniform size is not a whole number multiple of the size of a resource unit.

Figure 13:
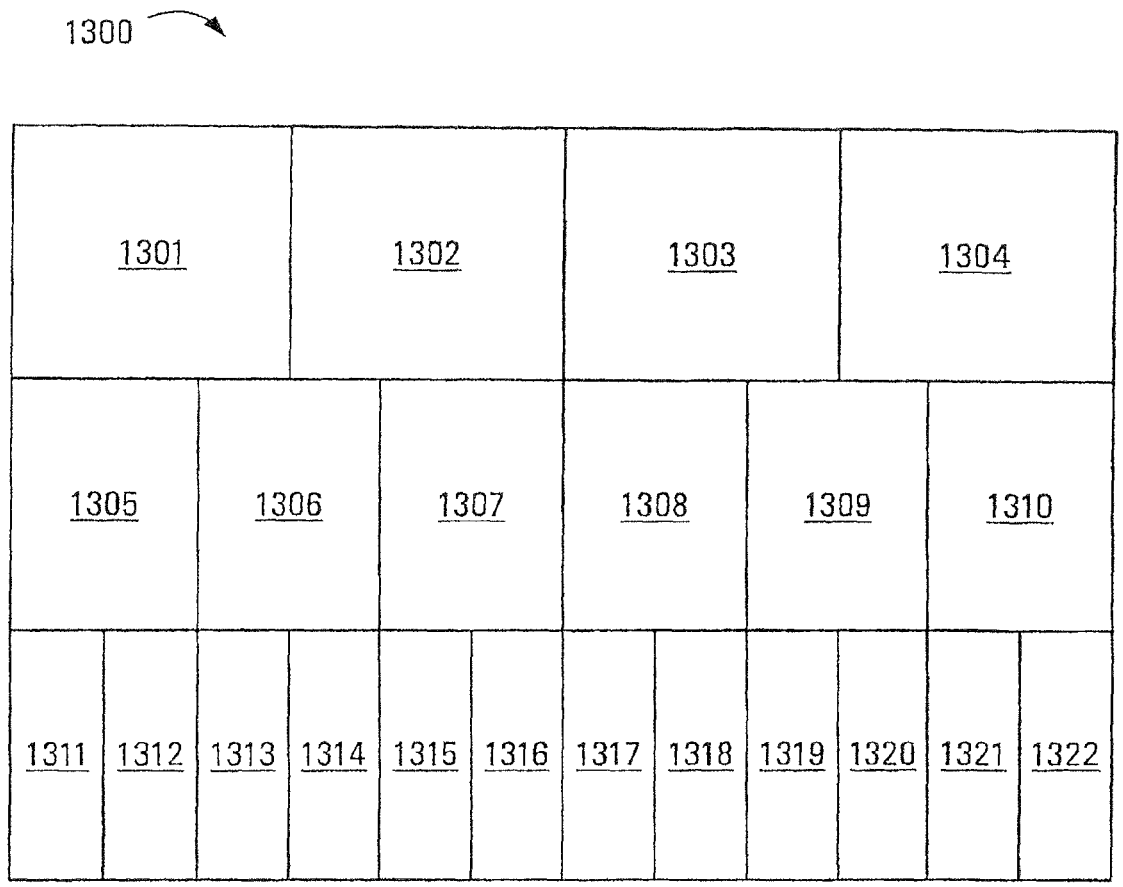
FIG. 13 illustrates a frame of channels defined using a non-hierarchical channel definition scheme according to an embodiment of the present invention.

A plurality of channel defined according to a non-hierarchical channel definition scheme is illustrated in FIG. 13, wherein the defined channels in the resource space 1300 include: four twelfth-resource space channels 1301, 1302, 1303, 1304; six eighteenth-resource space channels 1305, 1306, 1307, 1308, 1309, 1310; and twelve thirty-sixth-resource space channels 1311, 1312, 1313, 1314, 1315, 1316, 1317, 1318, 1319, 1320, 1321, 1322.

Alternatively, channels may be defined using a hybrid hierarchical/non-hierarchically scheme. The resource plane may be divided into N parts, where N will often be two. In a first option, a first part uses a non-hierarchical channel definition and a second part uses a hierarchical channel definition.

Definition of a plurality of channels defined using this first option the hybrid hierarchical/non-hierarchically channel definition scheme is illustrated in FIG. 14, wherein the defined channels in the first part of a resource space 1400 include: four 3/32-resource space channels 1401, 1402, 1403, 1404; and six sixteenth-resource space channels 1405, 1406, 1407, 1408, 1409, 1410. The defined channels in the second part of the resource space 1400 include 16 sixty-fourth-resource space channels 1411, 1412, 1413, 1414, 1415, 1416, 1417, 1418, 1419, 1420, 1421, 1422, 1423, 1424, 1425, 1426.

In a second option, both parts use a hierarchical channel definition, but the hierarchical channel definition of the first part uses a different maximum depth than the hierarchical channel definition of, the second part.

Definition of a plurality of channels using this second option of the hybrid hierarchical/non-hierarchically channel definition scheme is illustrated in FIG. 15, wherein the defined channels of a first part of a resource space 1500 have a maximum depth of 2 and include: two quarter-resource space channels 1501, 1502. The defined channels of a second part of the resource space 1500 have a maximum depth of 8 and include eight sixteenth-resource space channels 1503, 1504, 1505, 1506, 1507, 1508, 1509, 1510.

Figure 16:
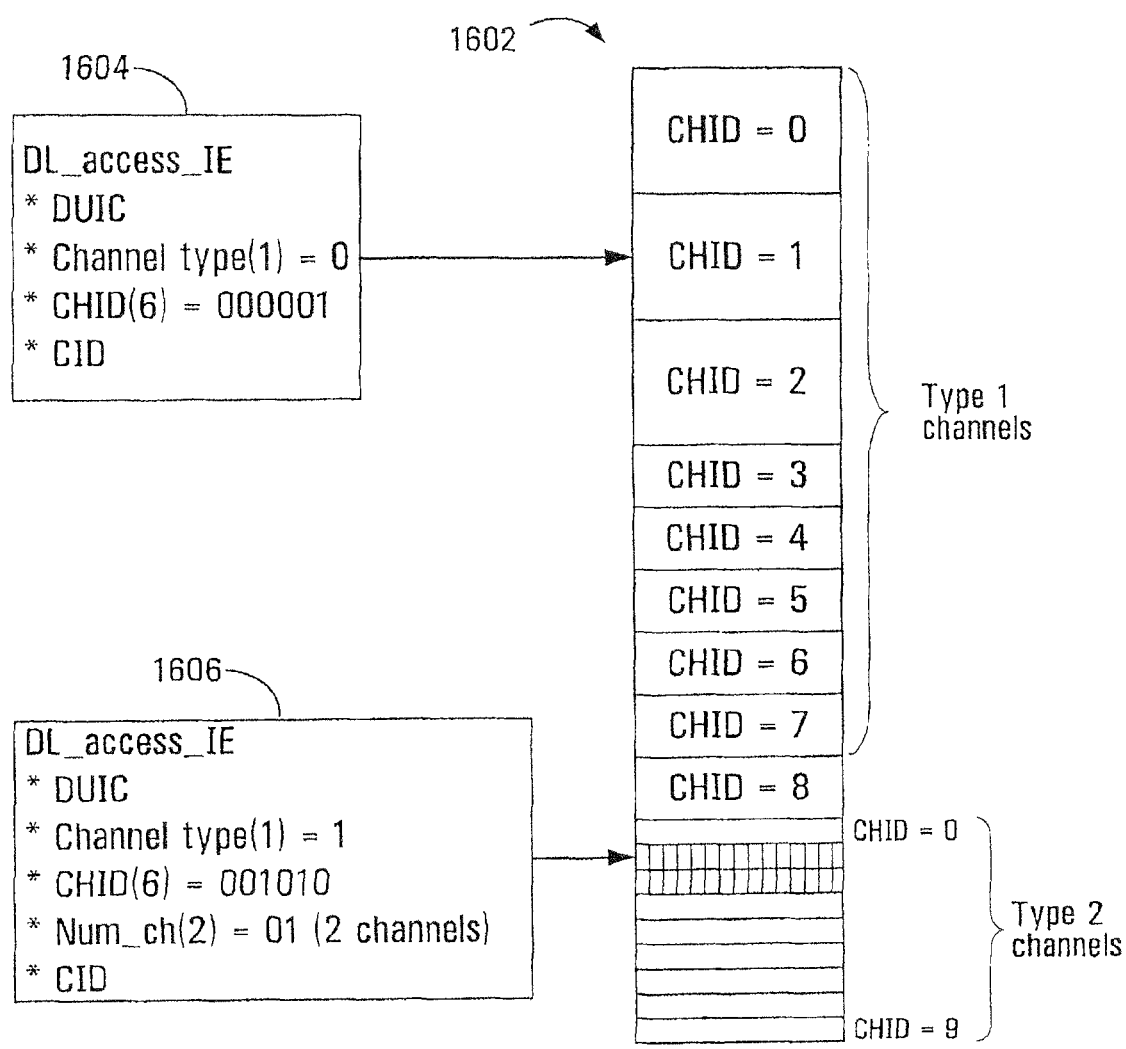
FIG. 16 illustrates a plurality of channels and DL access information elements according to an embodiment of the present invention.

FIG. 16 illustrates a plurality of channels 1602, a first DL access information element (DL_access_IE) 1604 and a second DL access information element 1606. The first DL_access_IE 1604 includes a DUIC; a 1-bit Channel type=0; a 6-bit CHID=000001; and a CID. The second DL_access_IE 1606 includes a DUIC; a 1-bit Channel type=0; a 6-bit CHID=000001; a 2-bit indication of the number of channels referred to=01 (two channels); and a CID. As will be apparent to one of skill in the art, logical channels are shown in the plurality of channels 1602.

Notably, in operation, a DL_access_IE is normally associated with each of the channels in the plurality of channels 1602. It should be clear to a person of ordinary skill in the art that the first DL_access_IE 1604 and the second DL_access_IE 1606 are merely presented as exemplary DL access information elements.

In some scenarios without irregular assignment, the overhead of DL resource allocation can be further reduced. Initially, the base station 14 may provide a Channel ID list corresponding to the plurality of channels 1602. Subsequently, the base station 14 may provide a plurality of DL access information elements in the same order as the channels in the Channel ID list. In such a case, the CHID field may be omitted and the overhead may be reduced further as a result. See, for example, the downlink resource allocation scheme shown in FIG. 17, which provides a channel definition 1702 and a plurality of corresponding DL access information elements that enable the reduced overhead, given that the channels are assigned in order. As will be apparent to one of skill in the art, logical channels are shown.

Figure 17:
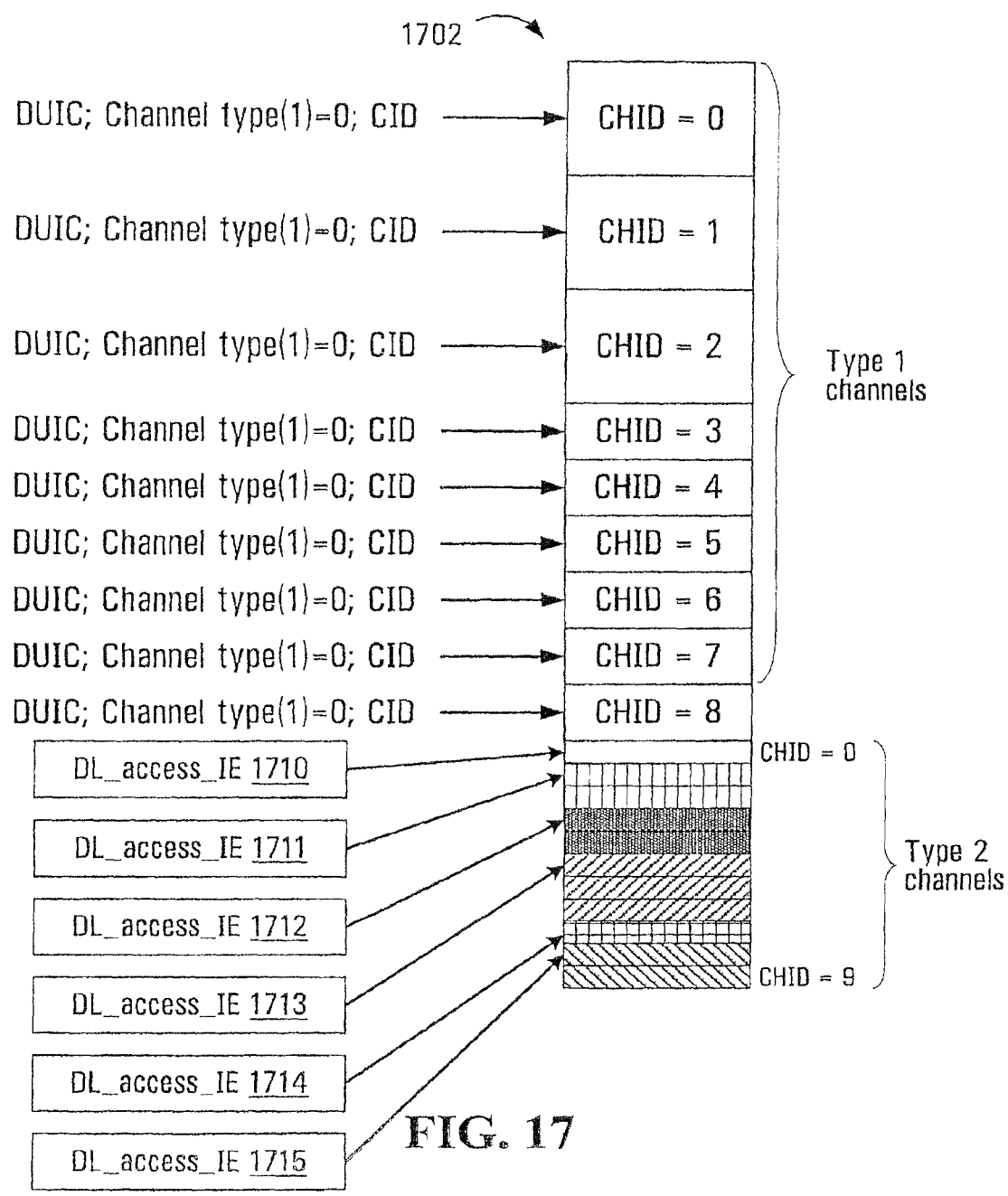
FIG. 17 illustrates a plurality of channels and DL access information elements according to an embodiment of the present invention.

In FIG. 17, DL_access_IE information elements for type 1 channels are illustrated. The DL_access_IE information elements for the type 2 channels are as follows. DL_access_IE 1710 includes: a DUIC; a 1-bit channel type=1; a 2-bit number of type 2 channels=00 (1 channel); and a CID. DL_access_IE 1711 includes: a DUIC; a 1-bit channel type=1; a 2-bit number of type 2 channels=01 (2 channels); CID. DL_access_IE 1712 includes: a DUIC; a 1-bit channel type=1; a 2-bit number of type 2 channels=01 (2 channels); and a CID. DL_access_IE 1713 includes: a DUIC; a 1-bit channel type=1; a 2-bit number of type 2 channels=10 (3 channels); and a CID. DL_access_IE 1714 includes: a DUIC; a 1-bit channel type=1; a 2-bit number of type 2 channels=00 (1 channel); and a CID. DL_access_IE 1715 includes: a DUIC; a 1-bit channel type=1; a 2-bit number of type 2 channels=01 (2 channels); and a CID.

Figure 18:
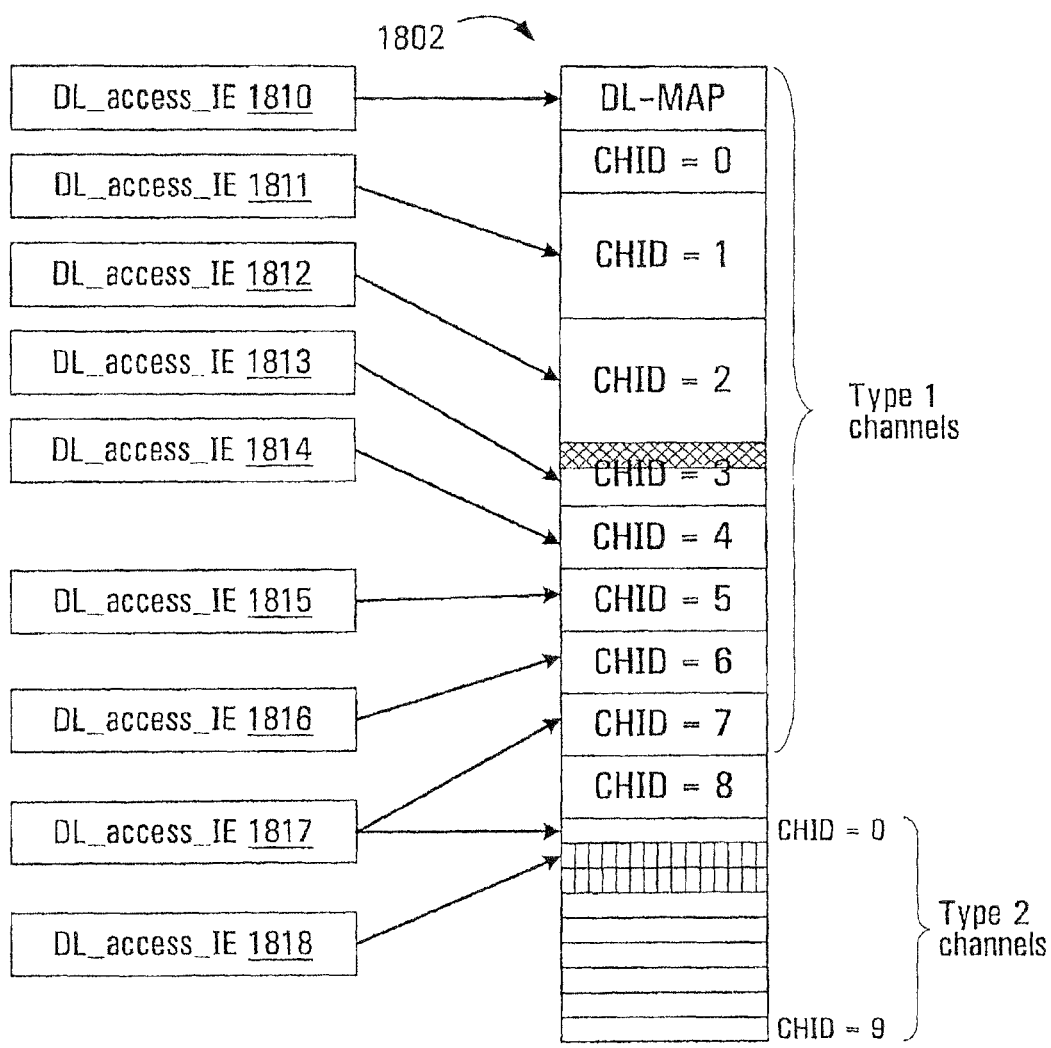
FIG. 18 illustrates a downlink resource allocation scheme shown in FIG. 17.

FIG. 18 provides another exemplary channel definition 1802, wherein a DL-MAP occupies a portion of a type 1 channel with CHID=0, some resources are assigned to soft hand off (SHO) mobile terminals 16 and some mobile terminals 16 are allocated both a type 1 channel and a type 2 channel.

In particular, channel 0 is partially occupied by DL-MAP; the remaining portion of channel 0 is allocated to a mobile terminal 16 in a DL_access_IE 1810 that includes: a DUIC; an OFDMA symbol offset; a sub-channel offset; a number of OFDMA symbols; a number of sub-channels; and a CID.

Channel 1 is assigned to a mobile terminal 16 in a DL_access_IE 1811 that includes: a DUIC; a 1-bit channel type=0; a 6-bit CHID=00001; and a CID.

Channel 2 is assigned to a mobile terminal 16 in a DL_access_IE 1812 that includes: a DUIC; a 1-bit channel type=0; and a CID. Note that a CHID is not necessary.

Part of channel 3 is occupied by an irregular assignment; the remaining portion of channel 3 is assigned to a mobile terminal 16 in a DL_access_IE 1813 that includes: a DUIC; an OFDMA symbol offset; a sub-channel offset; a number of OFDMA symbols; a number of sub-channels; and a CID.

Channel 4 is assigned to a mobile terminal 16 in a DL_access_IE 1814 that includes: a DUIC; a 1-bit channel type=0; a 6-bit CHID=00100; and a CID.

Channel 5 is assigned to a mobile terminal 16 in a DL_access_IE 1815 that includes: a DUIC; a 1-bit channel type=0; and a CID.

Channel 6 is assigned to a mobile terminal 16 in a DL_access_IE 1816 that includes: a DUIC; a 1-bit channel type=0; and a CID.

Type 1 channel 7 and type 2 channel 0 are assigned to a mobile terminal 16 in a DL_access_IE 1817 that includes: a DUIC; a 1-bit channel type=0; a further 1-bit channel type=1; a 6-bit CHID=00000; a 2-bit number of type 2 channels=00; and a CID.

Type 2 channels 1 and 2 are assigned to a mobile terminal 16 in a DL_access_IE 1818 that includes: a DUIC; a 1-bit channel type=1; a 2-bit number of type 2 channels=01; and a CID. Note that, due to consecutive assignments, the CHID is unnecessary.

The following provides an "enhance" DL MAP information element in accordance with an embodiment of the invention. This information element may be used by a base station 14 to indicate the DL resource allocation by using a two step DL resource assignment method.

| Syntax | Size | Notes |
|---|---|---|
| Enhance_DL_MAP_IE( ) { | | |
|   Extended DIUC | 4 bits | 0x09 |
|   Length | 4 bits | Length in bytes |
|   Num_Assignment | 4 bits | Number of assignments in this IE |
|   For (i=0; i<Num_Assignment;i++) { | | |
|     CID | 16 bits | |
|     DIUC | 4 bits | |
|     Boosting | 3 bits | |
|     Repetition Coding Indication | 2 bits | |
|     Assignment_Code | 3 bits | See following table |
|   If (Assignment_Code == 000) | | |
|     CHID | Num_bits_CHID | Indicated in DCD |
|   If (Assignment_Code == 001) | | |
|   { | | |
|     CHID | Num_bits_CHID | Indicated in DCD |
|     Num_Channel | 2 bits | |
|   } | | |
|   If (Assignment_Code == 010) { | | |
|     CHID | Num_bits_CHID | Indicated in DCD |
|     CHID | | |
|     Num_channels | 2 bits | |
|   } | | |
|   If (Assignment_Code == 011) { | | |
|     OFDMA_symbol_offset | 8 bits | |
|     Subchannel_offset | 6 bits | |
|     No. OFDMA symbols | 8 bits | |
|     No. subchannels | 6 bits | |
|   } | | |
|   If (Assignment_Code = 101\|110) | | |
|     Num_Channel | 2 bits | Indicated in DCD |
|   } | | |
| } | | |

Wherein:
Num_Assignment is Number of assignments in the IE.
The Assignment code values are explained as follows.

| Assignment_Code | Explanation |
|---|---|
| 0b000 | one type 1 channel assigned and explicitly indicated CHID |
| 0b001 | type 2 channel(s) assigned and explicitly indicated the CHID of the first channel assigned |
| 0b010 | one type 1 channel + type 2 channel(s) assigned and explicitly indicated CHIDs for the type 1 channel and the first type 2 channel |
| 0b011 | Using normal region description; When set, the resource allocation shall override the channel definition |
| 0b100 | one type 1 channel assigned and no explicitly indicated CHID (the type 1 channel shall be the channel following the channel (in channel list) assigned in previous type 1 channel assignment) |
| 0b101 | type 2 channel(s) assigned and no explicitly indicated CHID (the first type 2 channel shall be the channel following the channel(s) (in channel list) assigned in previous type 2 channel assignment) |
| 0b110 | one type 1 channel + type 2 channel(s) assigned and no explicitly indicated CHIDs for the type 1 channel and the type 2 channel (the type 1 channel shall be the channel following the channel (in channel list) assigned in previous type 1 channel assignment and the first type 2 channel shall be the channel following the channel(s) (in channel list) assigned in previous type 2 channel assignment) |
| 0b111 | reserved |

CHID is channel index defined in the DCD message.

Num_Channels is number of type 2 channel(s) assigned.

The following provides DCD channel encoding in accordance with an embodiment of the invention.

| Name | Type | Length | Values |
|---|---|---|---|
| DL allocated subchannel bitmap for optional AMC permutation | 18 | 6 | This is a bitmap describing the bands allocated to the segment in the DL, when using the optional AMC permutation. The LSB of the first byte shall correspond to band 0. For any bit that is not set, the corresponding band shall not be used by the mobile terminal on that segment. |
| DL channel definition | 19 | variable | Size of CHID field (6 bits)<br>Num_Type 1_channels (6 bits)<br>For (i = 0; i<Num_type1_channel;i++) {<br>  OFDMA symbol offset (8 bits)<br>  Subchannel offset (6 bits)<br>  No. OFDMA symbols (8 bits)<br>  No. subchannels (6 bits)<br>}<br>Num_Type 2_channels (6 bits)<br>For (i = 0; i<Num_type2_channel;i++) {<br>  OFDMA symbol offset (8 bits)<br>  Subchannel offset (6 bits)<br>  No. OFDMA symbols (8 bits)<br>  No. subchannels (6 bits)<br>}<br>padding bits to align boundary of byte |

It is recognized that, occasionally, irregular assignments will occur. An exemplary irregular assignment is a SHO, which requires synchronized resource assignment across all members in active set of a mobile terminal 16. In such cases, the DL access information element is required to be explicit about the location with the resource that is to be allocated. An exemplary format for such a DL access information element follows.

| Syntax | Size | Notes |
|---|---|---|
| DL_access_IE( ) {<br>  Num_CIDs<br>  For (i = 0; i<Num_CIDs; i++) {<br>    CID<br>  }<br>  DIUC<br>  OFDMA symbol offset<br>  Subchannel offset<br>  Boosting<br>  No. OFDMA symbols<br>  No. Subchannels<br>  Repetition Coding Indication<br>  Padding bits<br>} | <br>4 bits<br><br>16 bits<br><br>4 bits<br>8 bits<br>6 bits<br>3 bits<br>8 bits<br>8 bits<br>2 bits<br>variable | <br><br><br>Any type of CID<br><br><br><br><br><br><br><br><br>To align byte boundary |

In the current 802.16e draft standard (p802.16e/D5), DL and UL resource or data burst assignment is performed by layer 2 or MAC control messages called DL/UL-MAP messages. The DL/UL-MAP messages are encapsulated in the physical layer OFDMA region called the DL/UL-MAP region. Each DL/UL-MAP region contains one DL/UL-MAP message. Within the DL/UL MAP message, there are one or more broadcast, multicast or unicast information elements that contain information for one or more Mobile Subscriber Station (MSS, mobile terminals 16). The information elements are used for, among other things, assigning DL/UL OFDMA regions for mobile terminals 16 to receive/transmit DL/UL traffic or MAC messages.

The current DL/UL-MAP designs have many shortcomings including the following. First, there is no more room to define new IEs due to the limited number of IE type indicators, called the Downlink Interval Usage Code (DIUC) and Uplink Interval Usage Code (UIUC). The DIUC/UIUC is 4 bits in length, thus allowing only up to 16 types of IEs. To alleviate the problem, one of the DIUC/UIUC values (i.e., 15) is reserved for extending the IE types. When a DIUC/UIUC is set to 15, an extended DIUC/UIUC (also 4 bits) is included to indicate up to an additional 16 new IE types. Currently, in the draft standard, all the 15 plus 16, i.e. 31 DIUC/UIUC values have been used. Therefore, new IEs cannot be introduced. Second, there is no explicit indication of whether a broadcast IE is designated to all mobile terminals 16 or only those mobile terminals 16 in certain modes of operation (Normal, Sleep or Idle).

As will be apparent to one skilled in the art, a mobile terminal 16 can be in Normal mode, Sleep mode or idle Mode. A mobile terminal 16 in Normal mode continuously processes the DL/UL-MAP messages and can be assigned DL or UL resource or burst at any time. A mobile terminal 16 in sleep mode operates in cycles of a sleep interval followed by a listening interval. During the sleep interval, the mobile terminal 16 is not available to the base station 14 for DL traffic. However, the mobile terminal 16 may initiate UL traffic transmission during sleep interval. During listening interval, the mobile terminal 16 operates as in Normal mode. Sleep mode reduces the mobile terminal 16 battery consumption compared to Normal mode. For Idle mode, the mobile terminal 16 is not available for DL traffic and cannot initiate UL traffic. Furthermore, the mobile terminal 16 does not perform Hand Off. The mobile terminal 16 listens to paging signaling from the base station 14 during a designated paging interval. Idle Mode therefore provides the most power saving for the mobile terminal 16.

When a mobile terminal 16 is in Sleep mode—listening interval, or Idle Mode—paging interval, the mobile terminal 16 is required to decode the DL/UL-MAP message in order to receive unicast traffic (for sleep mode) or relevant broadcast traffic (for both sleep mode and idle mode). However, when the mobile terminal 16 receives an IE with broadcast connection identifier (broadcast CID), the mobile terminal 16 has to demodulate and decode the DL OFDMA region assigned by this IE, even though the DL broadcast traffic carried in that OFDMA region is not designated to the mobile terminal 16.

This is not power efficient for mobile terminals 16 in Sleep and Idle Modes since a given mobile terminal 16 has to demodulate and decode all DL broadcast traffic or messages.

The current DL and UL IEs are encapsulated in a DL-MAP and a separate UL-MAP. For the case of unicast burst assignment to the same mobile terminal 16 on both DL and UL, the 16-bit basic connection identifier (basic CID) of that mobile terminal 16 will appear twice, once in the DL-MAP and a second time in the UL-MAP. This may be considered to be unnecessary overhead.

According to the current design, a mobile terminal 16 in either Normal mode, Sleep mode—listening interval or Idle mode—paging interval is required to demodulate and decode all the DL and UL MAP regions and associated messages, even though many of the information elements contained in the MAP regions are not designated to that mobile terminal 16. The DL-MAP region and the UL-MAP region may be long and span multiple OFDMA symbols, this is not power efficient for an mobile terminal 16 in Idle mode and Sleep mode.

It is proposed herein to provide hierarchical MAP structures for broadband mobile wireless metropolitan area networks. Advantageously, the hierarchical MAP structures may be shown not to impact the operation of 802.16d mobile terminals and should be transparent to the 802.16d mobile terminal.

Figure 19:
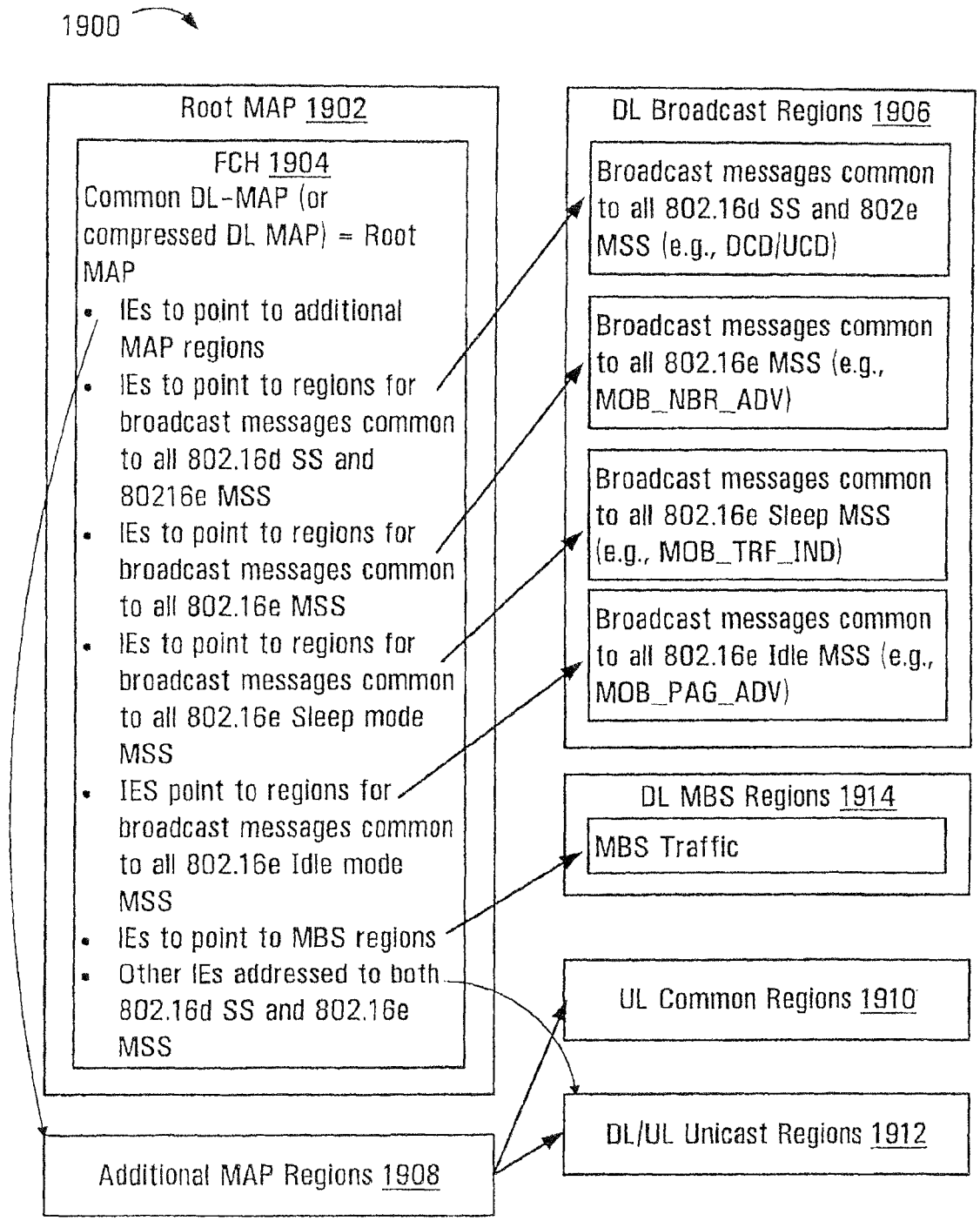
FIG. 19 presents a hierarchical mapping component structure in accordance with an embodiment of the invention.

FIG. 19 presents a hierarchical MAP structure 1900 in accordance with an embodiment of the invention. As will be apparent to one of skill in the art, the regions shown are logical regions rather than actual physical space defined by sub-channels and OFDMA symbols. The hierarchical MAP structure 1900 includes a Root Map, which contains a Frame Control Header (FCH) 1904, which, in turn, contains a DL-MAP, as is the case in the current 802.16d standard, for the purpose of backward compatibility.

Since the DL-MAP may be processed by mobile terminals 16 that intend to listen to DL traffic or messages including mobile terminals 16 in Normal mode, mobile terminals 16 in Sleep mode—listening interval and mobile terminals 16 in Idle mode—Paging interval, the DL-MAP may be used as the Root MAP 1902 to: point to additional DL/UL-MAP regions 1908, which only need to be processed by specific groups of mobile terminals 16; point to DL broadcast regions 1906; point to DL multicast-broadcast service (MBS) regions 1914; and contain DL IEs that are addressed to both 802.16d subscriber stations and to 802.16e Mobile Subscriber Stations, e.g., MIMO_DL_Basic_IE, etc. To target to a specific group of mobile terminals, each pointer may be associated with a multicast ID or an applicable allocation code, where the allocation code indicates a group of mobile terminals to which the message in the broadcast region is applicable.

The DL broadcast regions 1906 may be divided into four types:

regions containing broadcast messages for all 802.16d Subscriber Stations and 802.16e mobile terminals 16, e.g., system parameter broadcast (UCD, DCD) messages;

regions containing broadcast messages for all 802.16e mobile terminals, e.g., neighbor base station information advertisement (MOB_NBR_ADV) messages;

regions containing broadcast messages for all Sleep mode mobile terminals, e.g., traffic indication (MOB_TRF_IND) messages; and regions containing broadcast messages for all Idle mode mobile terminals, e.g., paging advertisement (MOB_PAG_ADV) messages.

In this way, a mobile terminal 16 operating in certain mode may only need to process the corresponding region and messages instead of having to process all broadcast regions and messages.

Additionally, a particular one of the MBS regions 1914 may be demodulated and decoded by mobile terminals 16 that are subscribed to the associated MBS.

Figure 20:
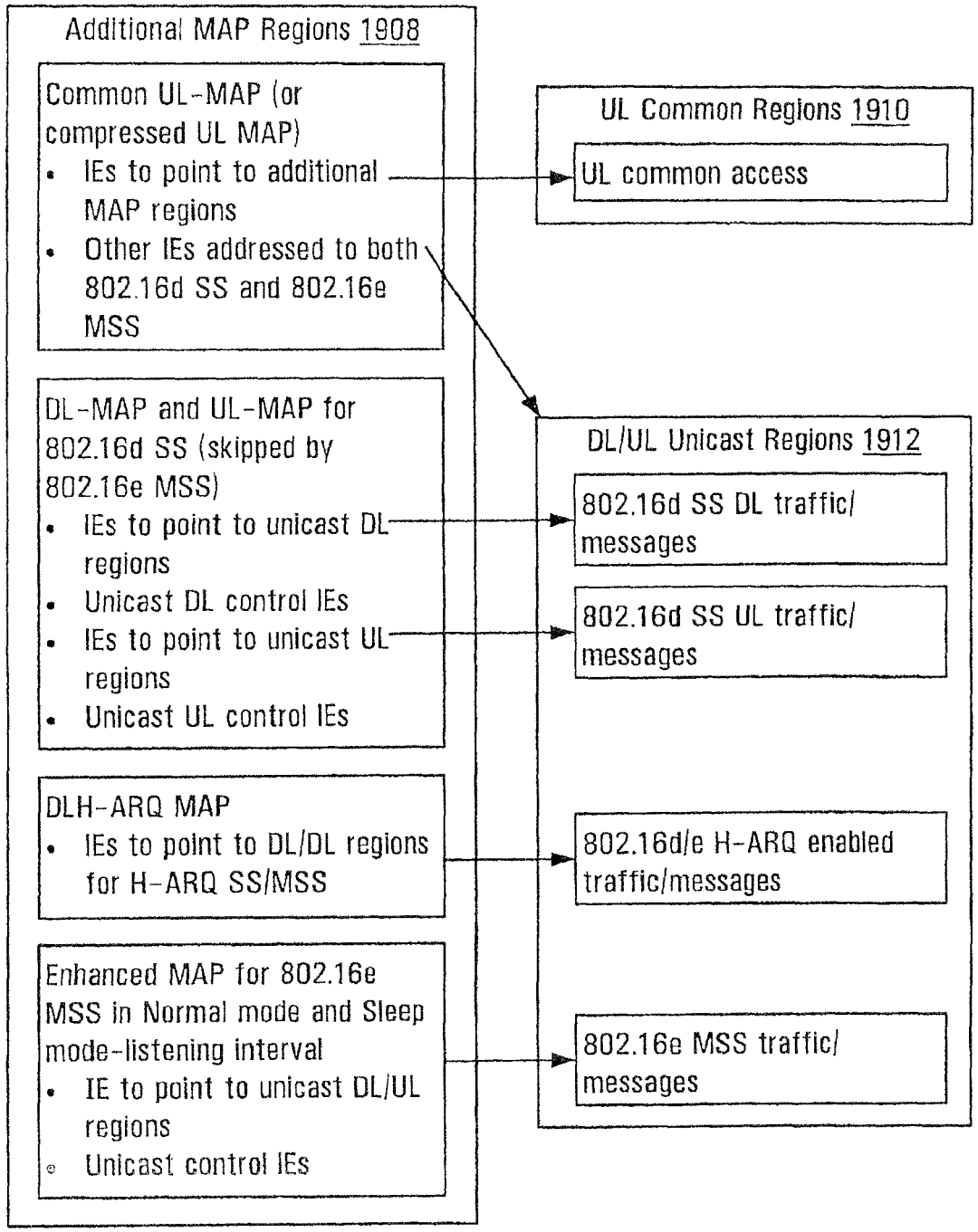
FIG. 20 presents further detail of the hierarchical mapping component structure of FIG. 19 in accordance with an embodiment of the invention.

As illustrated in FIG. 20 the additional MAP regions 1908 may include:

a MAP for UL common access for all 802.16d Subscriber Stations and 802.16e mobile stations (this MAP may processed by all 802.16d Subscriber Stations and 802.16e mobile stations that intend to perform UL access);

a unicast DL/UL MAP for all 802.16d Subscriber Stations (this MAP may be processed by all powered-on and registered Subscriber Stations; and a unicast DL/UL MAP for all 802.16e mobile terminals in Normal mode and Sleep mode—listening interval (this MAP may be processed by all 802.16e mobile terminals) in Normal mode or in Sleep mode—listening interval.

In this way, a particular type of mobile terminal only needs to process the corresponding MAP IEs instead of having to process all the MAP IEs.

It is proposed herein to provide hierarchical MAP structures which include an Enhanced MAP message (an "EN-MAP") that includes unicast IEs for all 802.16e mobile terminals in Normal mode or Sleep mode—listening interval. One characteristic of the EN-MAP message may be a lack of generic MAC header when the EN-MAP message is transmitted. A proposed EN-MAP format follows.

| Syntax | Size | Notes |
| --- | --- | --- |
| Enhanced-MAP_Message_Format ( ) { | | |
|   Length | 11 bits | The length in bytes of this message. |
|   Num_IEs | 7 bits | |
|   For (i = 0;i++;I < Num_IEs) | | |
|   { | | |
|     EN-MAP_IE( ) | variable | See EN-MAP_IE |
|   } | | |
|   Padding bits | variable | Ensure to align to the boundary of byte |
| } | | |

As illustrated above, an EN-MAP message may contain one or more EN-MAP information elements named EN-MAP_IE. Each EN-MAP_IE information element may contains an IE type field of 6 bits. The IE type field allows a number of types of information elements to be supported by the EN-MAP message. For each unicast resource allocation, the DL/UL resource allocations may be combined together into the same information element whenever possible to reduce MAC overhead, i.e., when the same basic CID for both DL and UL is used for the DL/UL resource allocation. An exemplary format for an EN-MAP_IE information element follows.

| Syntax | Size | Notes |
| --- | --- | --- |
| EN-MAP_IE( ) { | | |
|   IE_Type | 6 bits | |
|   Length | 6 bits | |
|   IE specific field | Variable | |
| } | | |

The 6-bit IE_Type may be encoded according to the following.

| Type | EN-MAP type encoding | En-MAP IE name | Format |
| --- | --- | --- | --- |
| 0 | 0b 000000 | DL access IE | |
| 1 | 0b 000001 | UL access IE | |
| 2 | 0b 000010 | DL/UL access IE | |
| 3 | 0b 000011 | DL AAS IE | removing the Extended DIUC and Length fields |
| 4 | 0b 000100 | DL TD_Zone IE | removing the Extended DIUC and Length fields |

-continued

| Type | EN-MAP type encoding | En-MAP IE name | Format |
|---|---|---|---|
| 5 | 0b 000101 | Channel measurement IE | removing the Extended DIUC and Length fields |
| 6 | 0b 000110 | Data_location_in_another_BS IE | removing the Extended DIUC, Length and reserved fields and inserting CID field |
| 7 | 0b 000111 | MIMO_DL_Basic IE | removing the Extended DIUC and Length fields |
| 8 | 0b 001000 | MIMO_DL_Enhanced IE | removing the Extended DIUC and Length fields |
| 9 | 0b 001001 | DL PUSC burst allocation in other segment IE | removing the Extended DIUC and Length fields |
| 10 | 0b 001010 | HO active anchor DL MAP IE | removing the Extended DIUC and Length fields |
| 11 | 0b 001011 | HO Active Anchor DL MAPIE | removing the Extended DIUC and Length fields |
| 12 | 0b 001100 | HO CID Translation IE | removing the Extended DIUC and Length fields |
| 13 | 0b 001101 | MIMO_in_another_BS IE | removing the Extended DIUC and Length fields |
| 14 | 0b 001110 | Macro_DL_Basic IE | removing the Extended DIUC and Length fields |
| 15 | 0b 001111 | Power control IE | removing the Extended DIUC, Length and reserved fields and inserting CID field |
| 16 | 0b 010000 | UL AAS IE | removing the Extended DIUC and Length fields |
| 17 | 0b 010001 | PAPR reduction, safety zone and sounding zone allocation IE | removing the Extended DIUC and Length fields |
| 18 | 0b 010010 | MIMO UL Basic IE | removing the Extended DIUC and Length fields |
| 19 | 0b 010011 | CQICH alloc IE | removing the Extended DIUC, Length and reserved fields and inserting CID field |
| 20 | 0b 010100 | UL physical Modifier IE | removing the Extended DIUC and Length fields |
| 21 | 0b 010101 | CQICH Enhance Allocation IE | removing the Extended DIUC and Length fields |
| 22 | 0b 010110 | UL PUSC Burst Allocation in other segment | removing the Extended DIUC and Length fields |
| 23 | 0b 010111 | HO active anchor UL MAP IE | removing the Extended DIUC and Length fields |
| 24 | 0b 011000 | HO Active Anchor UL MAPIE | removing the Extended DIUC and Length fields |
| 25 | 0b 011001 | Fast ranging IE | removing the Extended DIUC and Length fields |
| 26 | 0b 011010 | DL HARQ access IE | |
| 27 | 0b 011011 | DL MIMO-HARQ access IE | |
| 28 | 0b 011100 | UL HARQ access IE | |
| 29 | 0b 011101 | UL MIMO-HARQ access IE | |
| 30 | 0b 011110 | DL/UL HARQ access IE | |
| 31 | 0b 011111 | DL/UL MIMO-HARQ IE | |

An exemplary format for a UL access information element (EN-MAP type=0b 000001) follows.

| Syntax | Size | Notes |
|---|---|---|
| UL_access_IE( ) { | | |
| CID | 16 bits | |
| UIUC | 4 bits | |
| Duration | 10 bits | In OFDMA slot |
| Repetition code indication | 2 bits | 0b00: no repetition coding<br>0b01: Repetition coding of 2 used<br>0b10: Repetition coding of 4 used<br>0b11: Repetition coding of 6 used |
| } | | |

An exemplary format for a DL/UL access information element (EN-MAP type=0b 000010) follows.

| Syntax | Size | Notes |
|---|---|---|
| DL/UL_access_IE( ) { | | |
| CID | 16 bits | Basic CID if the UL resource allocation can be used by any UL connections; UL connection ID if the UL resource allocated for a specific UL connection (DL connection CID always appears in MAC header) |
| DIUC | | |
| OFDMA symbol offset | 8 bits | |
| Subchannel offset | 6 bits | |

-continued

| Syntax | Size | Notes |
| --- | --- | --- |
| Boosting | 3 bits | |
| No. OFDMA symbols | 8 bits | |
| No. Subchannels | 8 bits | |
| Repetition Coding Indication | 2 bits | |
| UIUC | 4 bits | |
| Duration | 10 bits | In OFDMA slot |
| Repetition code indication | 2 bits | 0b00: no repetition coding<br>0b01: Repetition coding of 2 used<br>0b10: Repetition coding of 4 used<br>0b11: Repetition coding of 6 used |
| } | | |

The Root MAP 1902 may include an MSS_region_IE information element to point to broadcast message regions specifically for 1) all 802.16e mobile terminals or 2) all 802.16e Sleep mode mobile terminals or 3) all 802.16e Idle mode mobile terminals. The MSS_region_IE may include an Applicability Code field to indicate which type of region is pointed to by the information element. The MSS_region_IE information element may also be used to point to the region for the EN-MAP message. An exemplary format for a MSS_region_IE information element follows.

| Syntax | Size | Notes |
| --- | --- | --- |
| MSS_region_IE( ) { | | |
|   Extended DIUC | 4 bits | S = 0x0B |
|   Length | 4 bits | |
|   DIUC | 4 bits | |
|   Applicability code | 2 bits | 0b00: access system configuration types of messages (e.g., MOB_NBR_ADV) by all 802.16e mobile terminals<br>0b01: access Enhanced MAP message by 802.16e mobile terminals in Normal and Sleep mode<br>0b10: access the Sleep mode specific messages (e.g., MOB_TRF_IND) by 802.16e mobile terminals in Sleep mode<br>0b11: Access idle mode specific messages (e.g., MOB_PAG_ADV) by 802.16e mobile terminals in Idle mode |
|   OFDMA symbol offset | 8 bits | |
|   Subchannel offset | 6 bits | |
|   Boosting | 3 bits | |
|   No. OFDMA symbols | 8 bits | |
|   No. Subchannels | 8 bits | |
|   Repetition Coding Indication | 2 bits | |
|   Padding bits | variable | To align byte boundary |
| } | | |

A Skip_IE information element may be provided in the Root MAP, to allow an 802.16e mobile terminal to disregard, i.e., avoid processing, regions designated for 802.16d subscriber stations. The Skip_IE information element may be used to toggle the enabling and disabling of processing of regions designated by information elements following the Skip_IE information element. An exemplary Skip_IE information element format follows.

| Syntax | Size | Notes |
| --- | --- | --- |
| Skip_IE( ) { | | |
|   Extended DIUC | 4 bits | S = 0x0A |
|   Length | 4 bits | |
| } | | |

A 802.16e mobile terminal may sequentially process information elements and, if applicable, the associated regions designated by the information elements in the Root MAP. When the first Skip_IE information element is encountered, the mobile terminal may not process the region designated by information elements following the Skip_IE information element. When a second Skip_IE information element is encountered, the mobile terminal reverts back to processing the region designated by the information elements following the Skip_IE information element, when applicable. When the next Skip_IE information element is encountered, the mobile terminal again disables processing of regions designated by subsequent information elements. This procedure may continue until the end of the Root MAP.

Advantageously, by implementing aspects of the present invention, both backward compatibility with 802.16d subscriber stations and power saving and overhead reduction for 802.16e mobile terminals can be achieved. In particular, 802.16d subscriber stations may be expected to ignore any newly introduced information elements.

Unicast information designated for 802.16d subscriber stations may be skipped for power saving purposes by 802.16e mobile terminals 16. Also, 802.16e mobile terminals 16 in certain modes (Normal, Sleep, Idle) may only process the relevant regions designated for the mobile terminal.

Advantageously, aspects of the invention reduce resource allocation signaling overhead by dividing resource space into sub-resource spaces with reasonable size, shape. Furthermore, aspects of the invention reduce power consumption of mobile terminals by enhancing allocation signaling.

Other modifications will be apparent to those skilled in the art and, therefore, the invention is defined in the claims.

We claim:
1. A method, comprising:
at a mobile terminal:
receiving a broadcast message from a cell of a base station, the broadcast message indicating to the mobile terminal a downlink Orthogonal Frequency-Division Multiplexing (OFDM) resource space allocated by the cell, the broadcast message further providing a definition for a plurality of sub-resource spaces within the OFDM resource space; and
receiving at least part of a subframe from the cell of the base station, wherein the subframe comprises a respective sub-burst corresponding to the mobile terminal within at least one of the plurality of sub-resource spaces within the OFDM resource space;
wherein the subframe further comprises a downlink mapping component that includes information for the mobile terminal indicating where the respective sub-burst for the mobile terminal is located in the OFDM resource space.
2. The method of claim 1, wherein the subframe further comprises an information element to prevent unnecessary processing.
3. The method of claim 1, wherein the subframe includes a plurality of sub-resource spaces within the OFDM resource space corresponding to other mobile terminals.

4. The method of claim 1, wherein a sub-resource space comprises at least one of an indication of a symbol offset, an indication of a sub-channel offset, an indication of a number of symbols, and an indication of a number of sub-channels.

5. The method of claim 1, wherein the downlink mapping component includes one of (a) an information element that references a further mapping component that includes an allocation element configured to allocate a given sub-resource space to a grouping of mobile terminals and (b) an information element that allows the mobile terminal to disregard an additional information element in the downlink mapping component, wherein the plurality of sub-resource spaces comprises a plurality of sub-resource spaces that are defined to occupy contiguous sub-resource spaces.

6. The method of claim 5, wherein the information element that allows the mobile terminal to disregard the additional information element further enables allows the mobile terminal toggle between enabling and disabling a processing of regions designated an information element following the information element that allows the mobile terminal to disregard the additional information element.

7. The method of claim 1, wherein allocation of the plurality of sub-resources spaces are updated in scheduling messages.

8. The method of claim 1, wherein the information for the mobile terminal indicates that the respective sub-burst for the mobile terminal is located at respective portions of more than one of the plurality of sub-resource spaces.

9. The method of claim 1, wherein the information for the mobile terminal indicates that the respective sub-burst for the mobile terminal is located at portions of a particular sub-resource space, wherein the information includes the sub-resource space identifier corresponding to the particular sub-resource space and the relative location of the of the portions within the particular of sub-resource space.

10. A mobile terminal, comprising:
receive circuitry configured to receive a broadcast message and at least part of a subframe from a cell of a base station; and
a processor configured to process the broadcast message and the subframe,
wherein the broadcast message indicates to the mobile terminal a downlink Orthogonal Frequency-Division Multiplexing (OFDM) resource space allocated by the cell, the broadcast message further providing a definition for a plurality of sub-resource spaces within the OFDM resource space;
wherein the subframe comprises a respective sub-burst corresponding to the mobile terminal within at least one of the plurality of sub-resource spaces within the OFDM resource space;
wherein the subframe further comprises a downlink mapping component that includes information for the mobile terminal indicating where the respective sub-burst for the mobile terminal is located in the OFDM resource space.

11. The mobile terminal of claim 10, wherein the subframe further comprises an information element to prevent unnecessary processing.

12. The mobile terminal of claim 10, wherein the subframe includes a plurality of sub-resource spaces within the OFDM resource space corresponding to other mobile terminals.

13. The mobile terminal of claim 10, wherein the downlink mapping component includes one of (a) an information element that references a further mapping component that includes an allocation element configured to allocate a given sub-resource space to a grouping of mobile terminals and (b) an information element that allows the mobile terminal to disregard an additional information element in the downlink mapping component, wherein the plurality of sub-resource spaces comprises a plurality of sub-resource spaces that are defined to occupy contiguous sub-resource spaces.

14. The mobile terminal of claim 13, wherein the information element that allows the mobile terminal to disregard the additional information element further enables allows the mobile terminal toggle between enabling and disabling a processing of regions designated an information element following the information element that allows the mobile terminal to disregard the additional information element.

15. An integrated circuit comprising circuitry:
receive circuitry configured to receive a broadcast message and at least part of a subframe from a cell of a base station; and
a baseband processor comprised of circuitry configured to process the broadcast message and at least part of a subframe,
wherein the broadcast message indicates to the mobile terminal a downlink Orthogonal Frequency-Division Multiplexing (OFDM) resource space allocated by the cell, the broadcast message further providing a definition for a plurality of sub-resource spaces within the OFDM resource space;
wherein the subframe comprises a respective sub-burst corresponding to a mobile terminal within at least one of the plurality of sub-resource spaces the OFDM resource space;
wherein the subframe further comprises a downlink mapping component that includes information for the mobile terminal indicating where the respective sub-burst for the mobile terminal is located in the OFDM resource space.

16. The integrated circuit of claim 15, wherein the integrated circuit is one of a baseband processor, a digital signal processor or an application specific integrated circuit.

17. The integrated circuit of claim 15, wherein the downlink mapping component includes one of (a) an information element that references a further mapping component that includes an allocation element configured to allocate a given sub-resource space to a grouping of mobile terminals and (b) an information element that allows the mobile terminal to disregard an additional information element in the downlink mapping component, wherein the plurality of sub-resource spaces comprises a plurality of sub-resource spaces that are defined to occupy contiguous sub-resource spaces.

18. The integrated circuit of claim 17, wherein the information element that allows the mobile terminal to disregard the additional information element further enables allows the mobile terminal toggle between enabling and disabling a processing of regions designated an information element following the information element that allows the mobile terminal to disregard the additional information element.

* * * * *

UNITED STATES PATENT AND TRADEMARK OFFICE
CERTIFICATE OF CORRECTION

PATENT NO. : 10,959,227 B2
APPLICATION NO. : 15/823120
DATED : March 23, 2021
INVENTOR(S) : Zhang et al.

It is certified that error appears in the above-identified patent and that said Letters Patent is hereby corrected as shown below:

In the Claims

Claim 6, Column 47, Lines 17:
"additional information element further enables allows the" should read "additional information element further enables the"

Claim 9, Column 47, Lines 34:
"sub-resource space and the relative location of the of the" should read "sub-resource space and the relative location of the"

Claim 14, Column 48, Lines 14:
"the additional information element further enables allows" should read "the additional information element further enables"

Claim 15, Column 48, Lines 19:
"An integrated circuit comprising circuitry:" should read "An integrated circuit comprising:"

Claim 18, Column 48, Lines 58:
"the additional information element further enables allows" should read "the additional information element further enables"

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*